United States Patent
Kawazu et al.

(10) Patent No.: US 10,992,889 B2
(45) Date of Patent: Apr. 27, 2021

(54) IMAGE SENSOR AND IMAGING DEVICE

(71) Applicant: Sony Semiconductor Solutions Corporation, Kanagawa (JP)

(72) Inventors: Naoki Kawazu, Kanagawa (JP); Motonobu Torii, Fukuoka (JP); Motohashi Yuichi, Tokyo (JP); Atsushi Suzuki, Kanagawa (JP); Junichiro Azami, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/332,145

(22) PCT Filed: Oct. 16, 2017

(86) PCT No.: PCT/JP2017/037371
§ 371 (c)(1),
(2) Date: Mar. 11, 2019

(87) PCT Pub. No.: WO2018/100902
PCT Pub. Date: Jun. 7, 2018

(65) Prior Publication Data
US 2019/0373190 A1    Dec. 5, 2019

(30) Foreign Application Priority Data

Dec. 1, 2016 (JP) .............................. JP2016-233875

(51) Int. Cl.
*H04N 5/232* (2006.01)
*H04N 7/00* (2011.01)
(Continued)

(52) U.S. Cl.
CPC ......... *H04N 5/367* (2013.01); *H04N 5/37213* (2013.01); *H04N 17/002* (2013.01)

(58) Field of Classification Search
None
See application file for complete search history.

(56) References Cited

U.S. PATENT DOCUMENTS

| 8,823,850 B2 | 9/2014 | Rysinski et al. |
| 8,953,047 B2 | 2/2015 | Martinussen |
| (Continued) | | |

FOREIGN PATENT DOCUMENTS

WO    WO 2008/150634 A1    12/2008

OTHER PUBLICATIONS

International Search Report and Written Opinion dated Feb. 6. 2018 in connection with International Application No. PCT/JP2017/037371.

(Continued)

*Primary Examiner* — Mark T Monk
(74) *Attorney, Agent, or Firm* — Wolf, Greenfield & Sacks, P.C.

(57) ABSTRACT

A first pixel comprises a first transfer transistor, a first reset transistor, a first amplifier transistor and a first select transistor. The first transfer transistor has a first terminal coupled to a reference signal generation circuit. The first reset transistor has a first terminal coupled to the reference signal generation circuit. The first amplifier transistor has a gate coupled to a second terminal of the first reset transistor and a second terminal of the first transfer transistor. The first select transistor is coupled to the first amplifier transistor. A second pixel comprises a first photoelectric conversion element, a second transfer transistor coupled to the first photoelectric conversion element, a second reset transistor configured to receive a first predetermined voltage, a second amplifier transistor coupled to the second transfer transistor and the second reset transistor, and a second select transistor coupled to the second amplifier transistor.

15 Claims, 28 Drawing Sheets

(51) Int. Cl.
*H04N 5/367* (2011.01)
*H04N 5/372* (2011.01)
*H04N 17/00* (2006.01)

(56) References Cited

U.S. PATENT DOCUMENTS

| | | | |
|---|---|---|---|
| 2008/0303905 A1 | 12/2008 | Chinnaveerappan | |
| 2009/0066793 A1* | 3/2009 | Takeda | H04N 17/002 348/148 |
| 2012/0169909 A1* | 7/2012 | Rysinski | H04N 17/002 348/302 |
| 2012/0207382 A1* | 8/2012 | Maeda | G06K 9/00557 382/149 |
| 2013/0293724 A1* | 11/2013 | Martinussen | H04N 17/002 348/175 |
| 2015/0229857 A1* | 8/2015 | Ichikawa | H04N 5/374 348/250 |
| 2020/0053308 A1 | 2/2020 | Niwa et al. | |

OTHER PUBLICATIONS

International Preliminary Report on Patentability dated Jun. 13, 2019 in connection with International Application No. PCT/JP2017/037371.

Japanese Office Action dated Dec. 8, 2020 in connection with Japanese Application No. 2016-233875 and English translation thereof.

* cited by examiner

[Fig. 1]
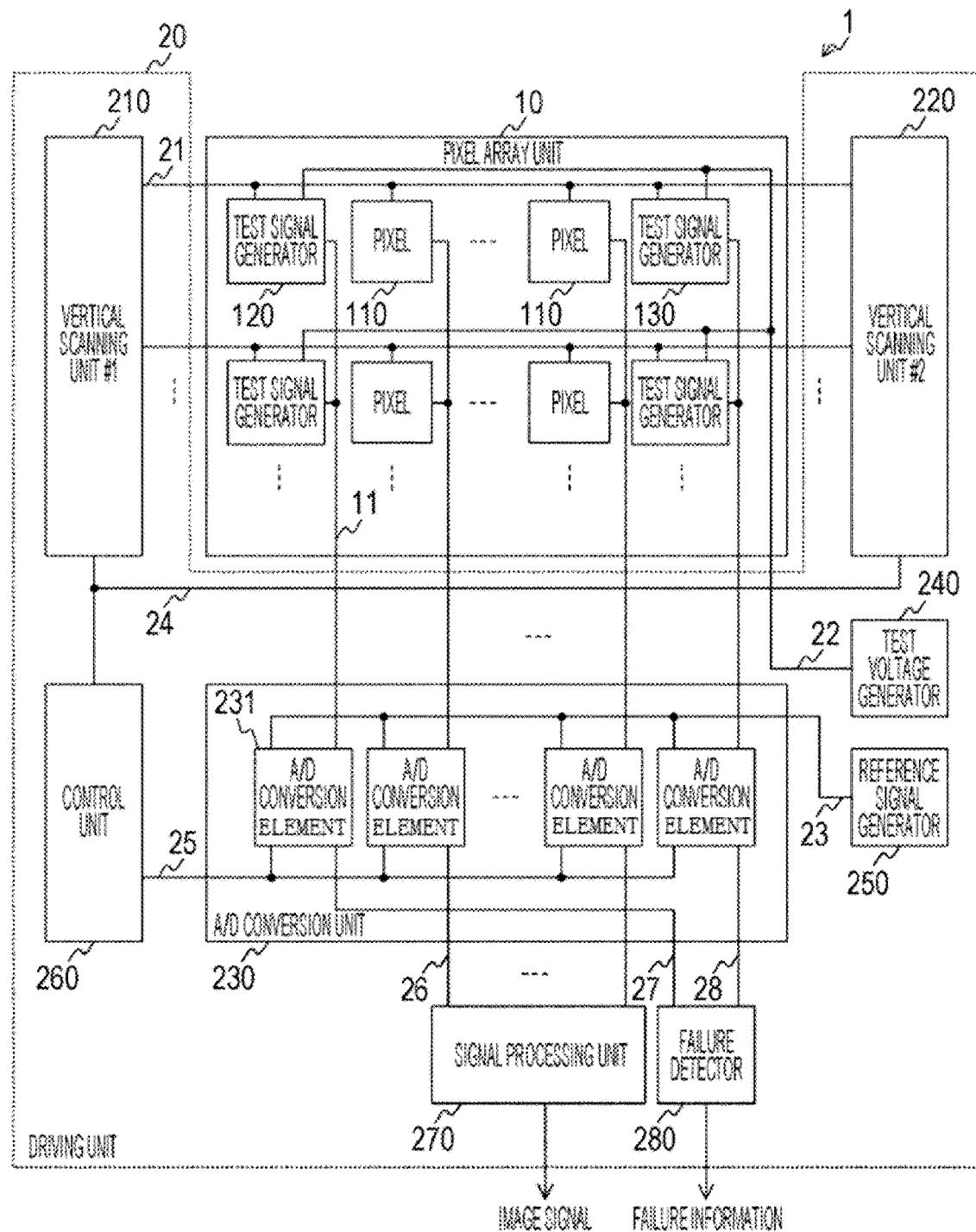

[Fig. 2]
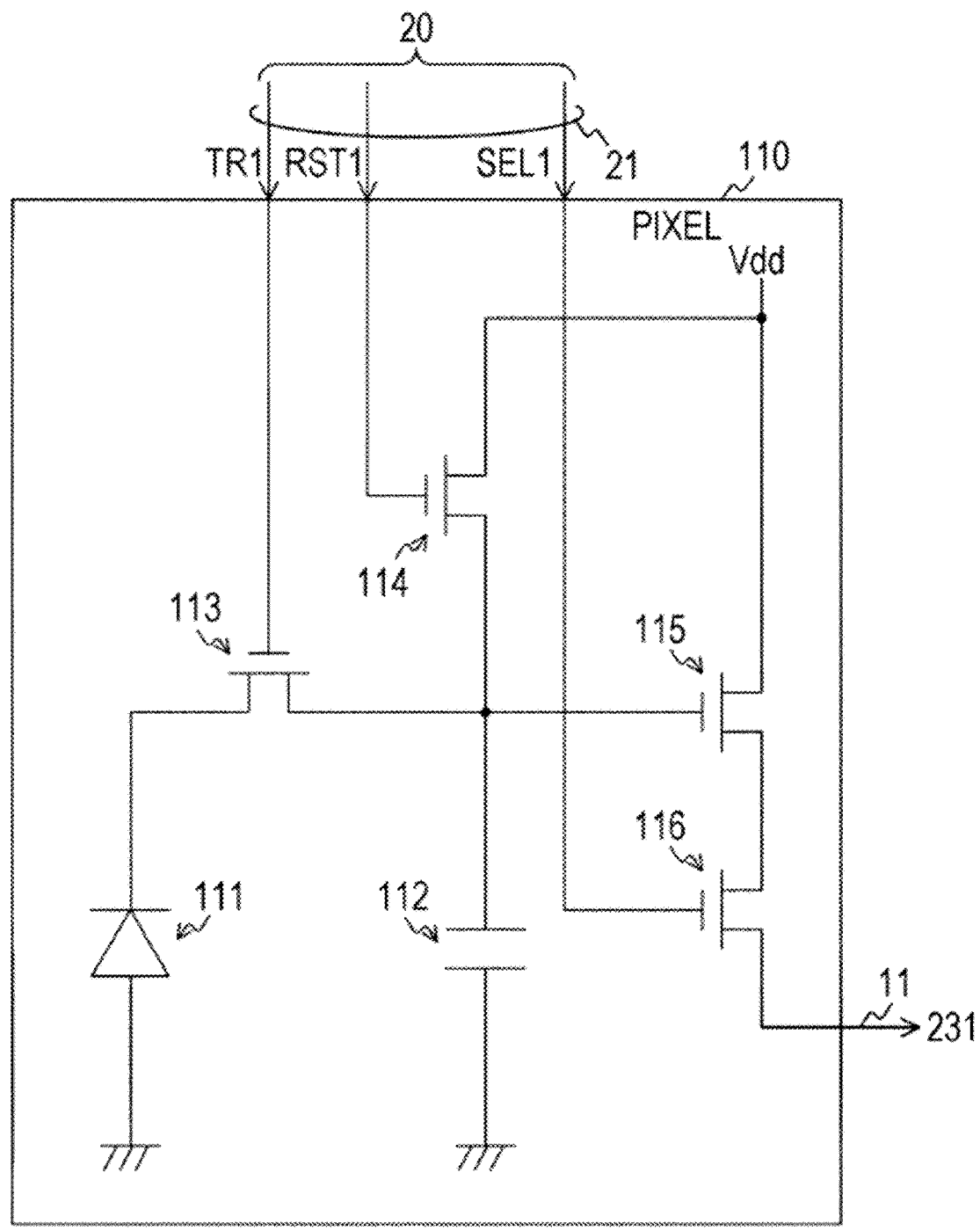

[Fig. 3]
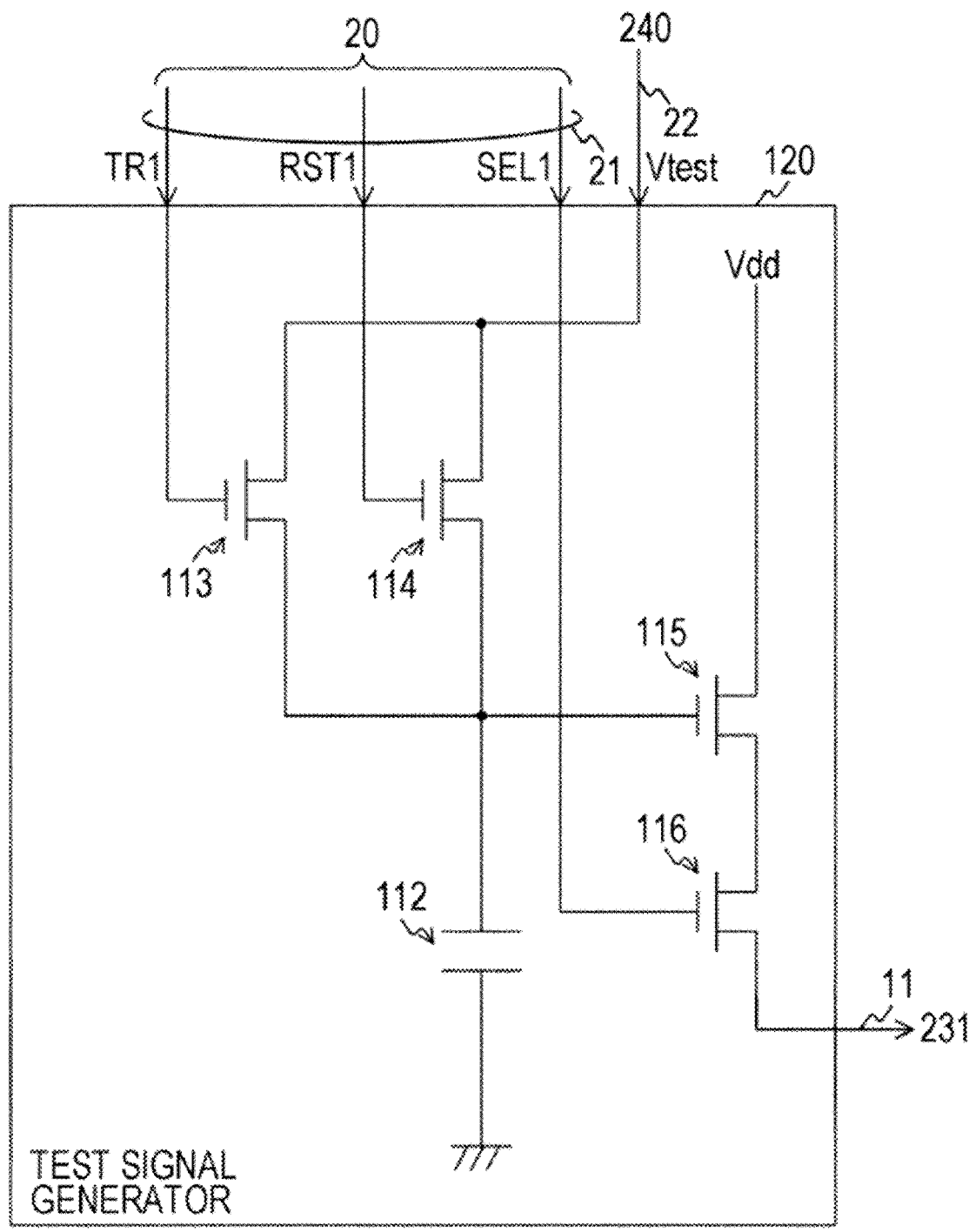

[Fig. 4]
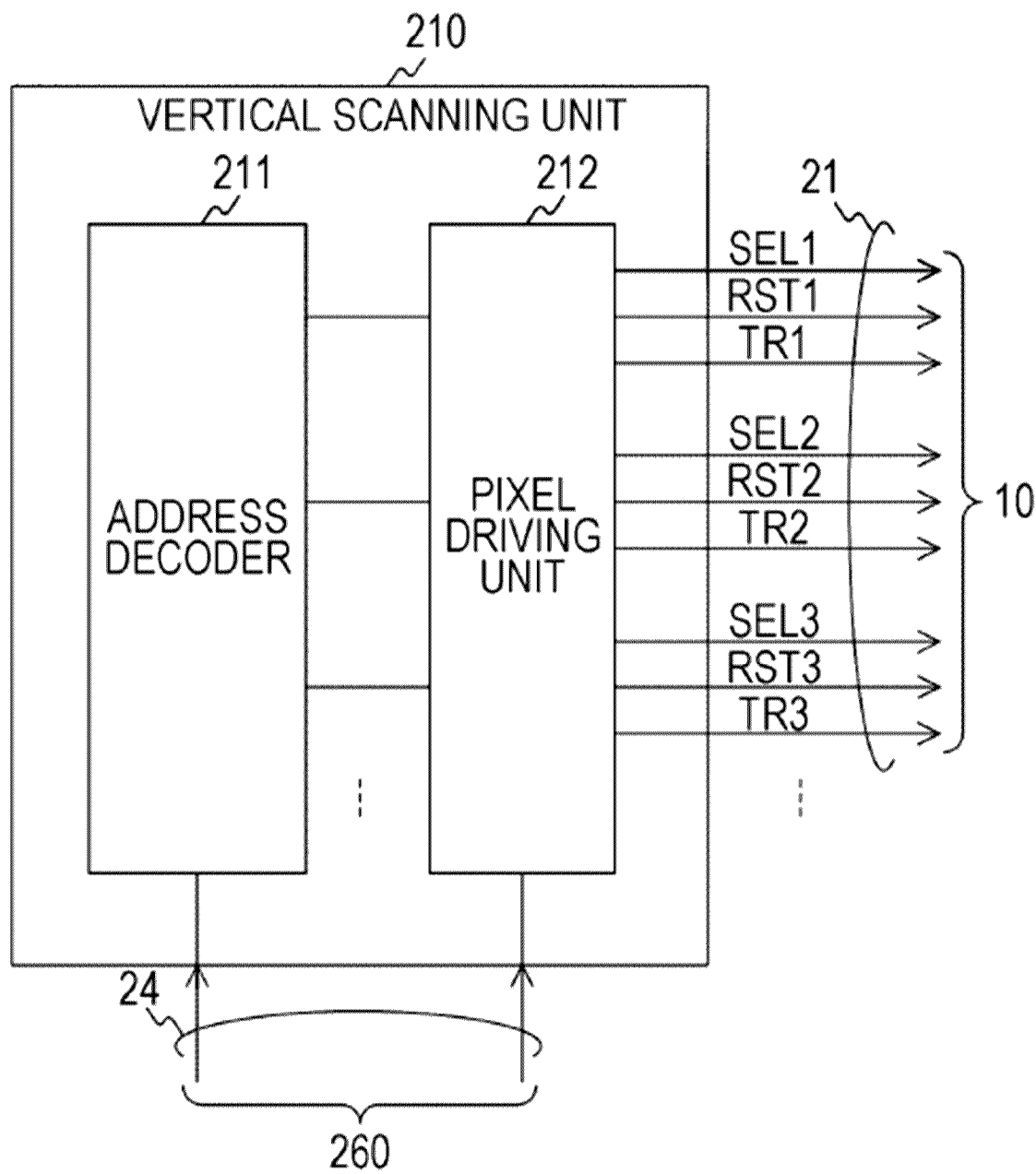

[Fig. 5]
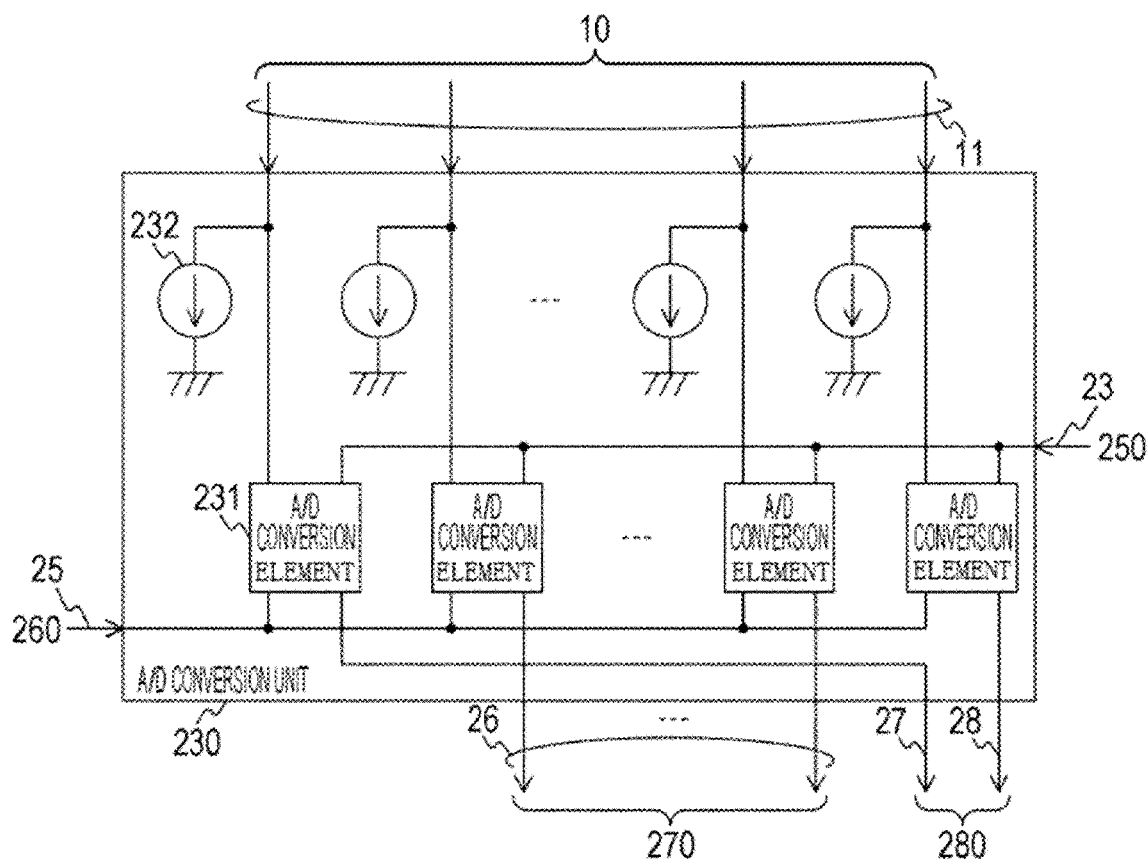

[Fig. 6]
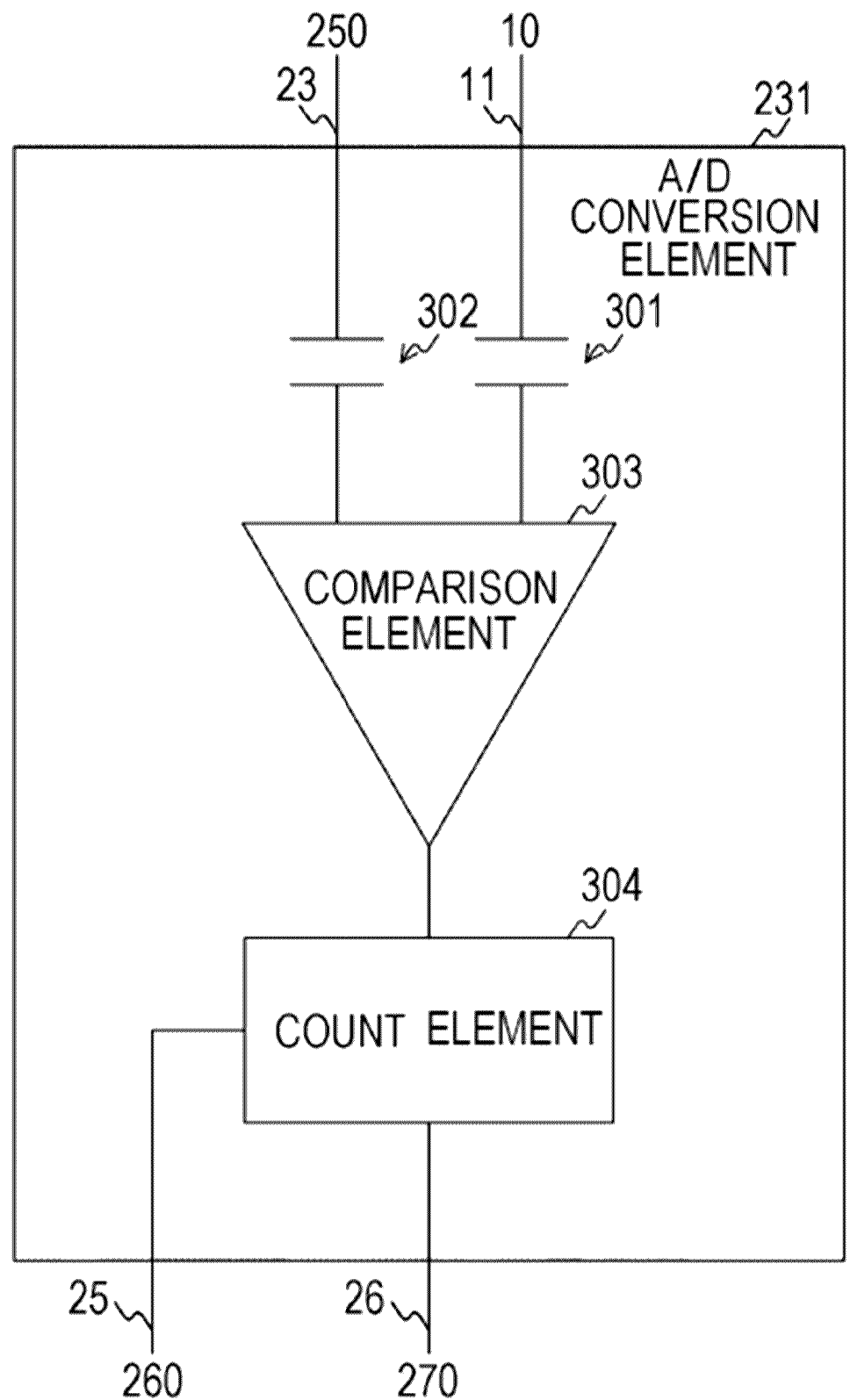

[Fig. 7]
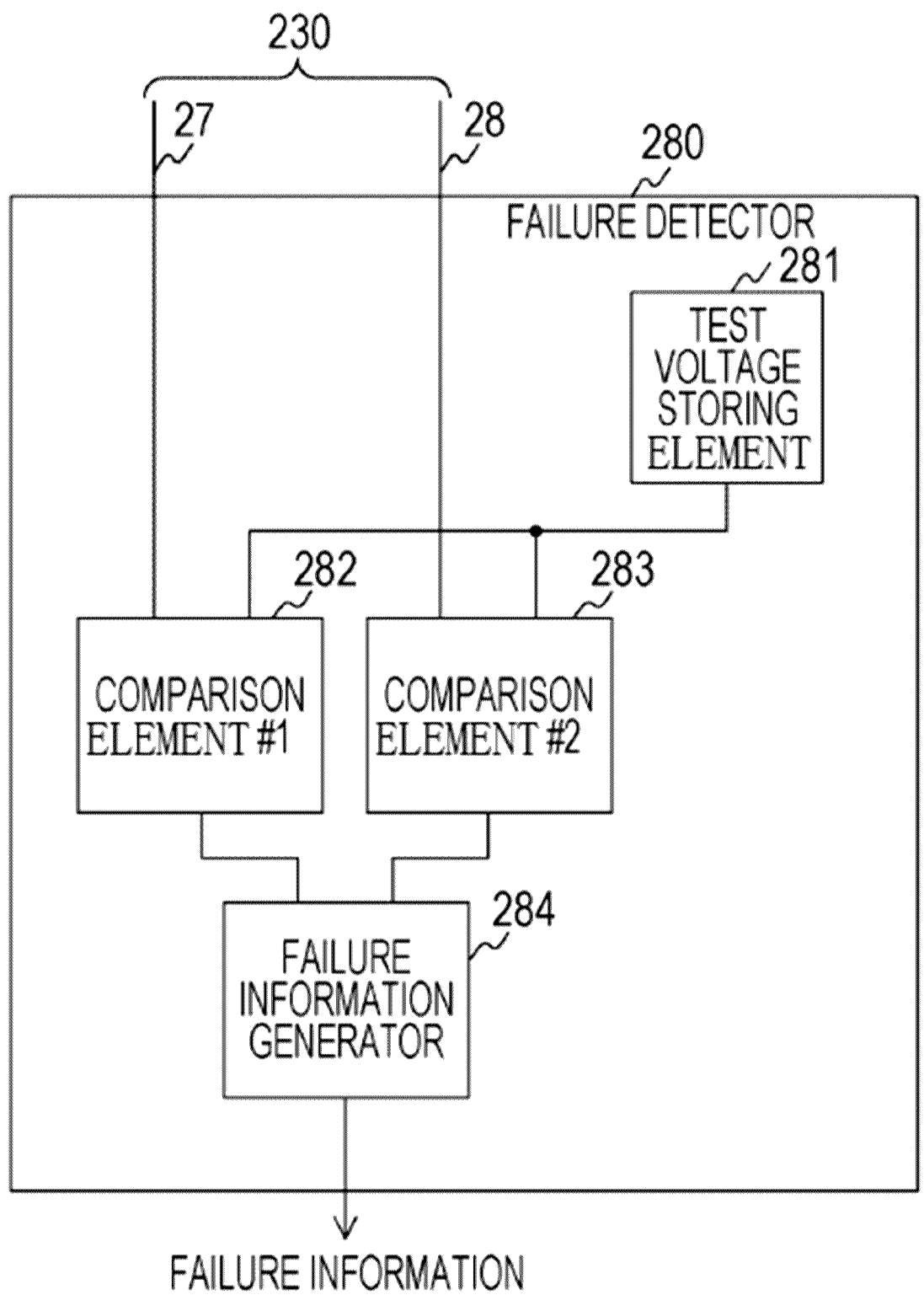

[Fig. 8]
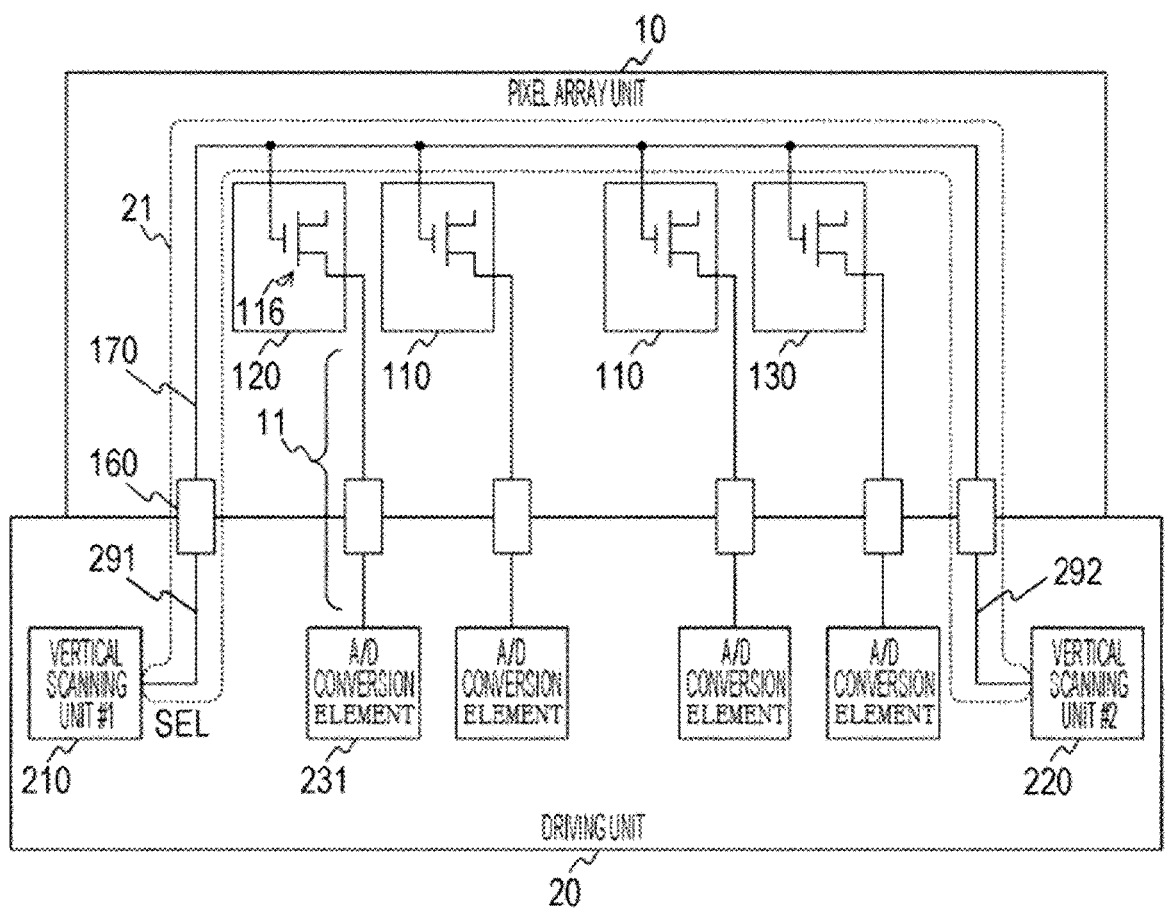

[Fig. 9]
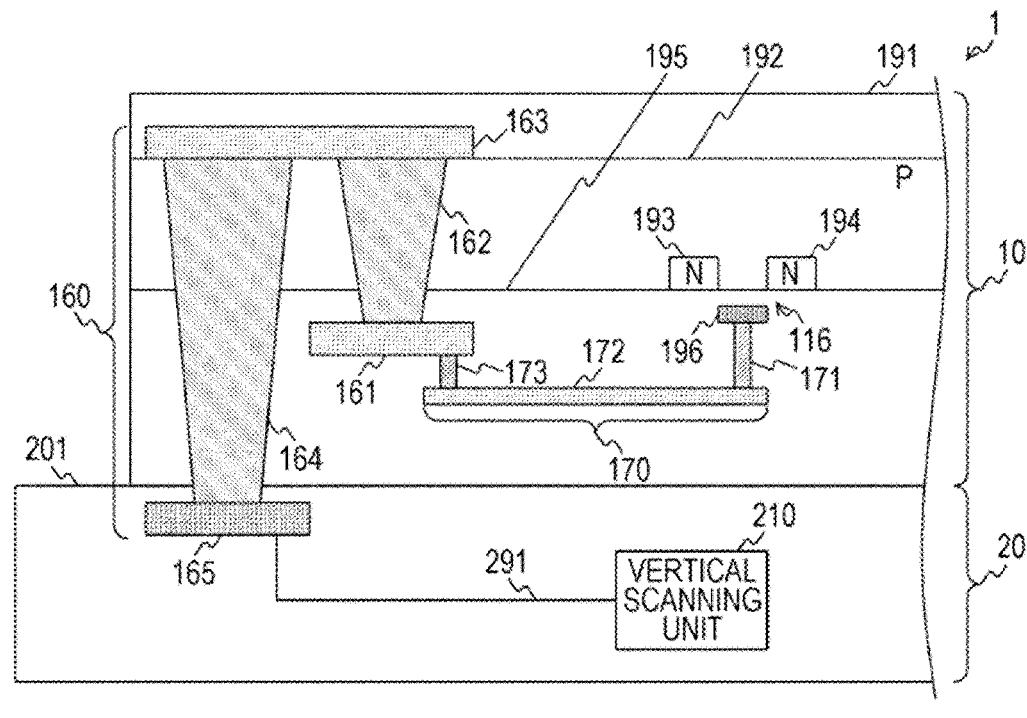
a
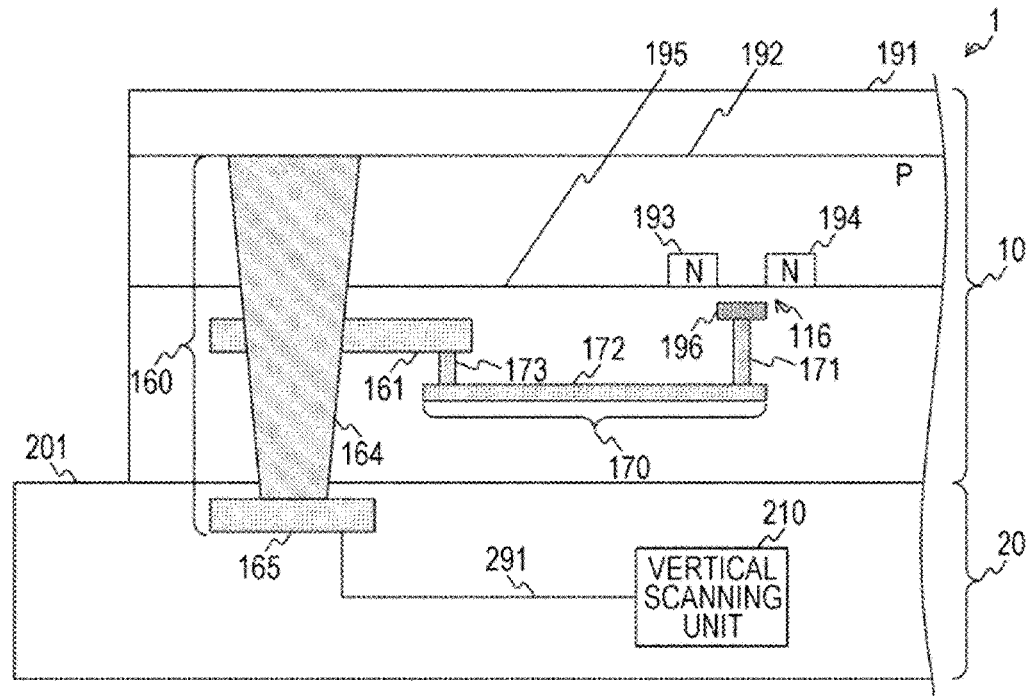
b

[Fig. 10]
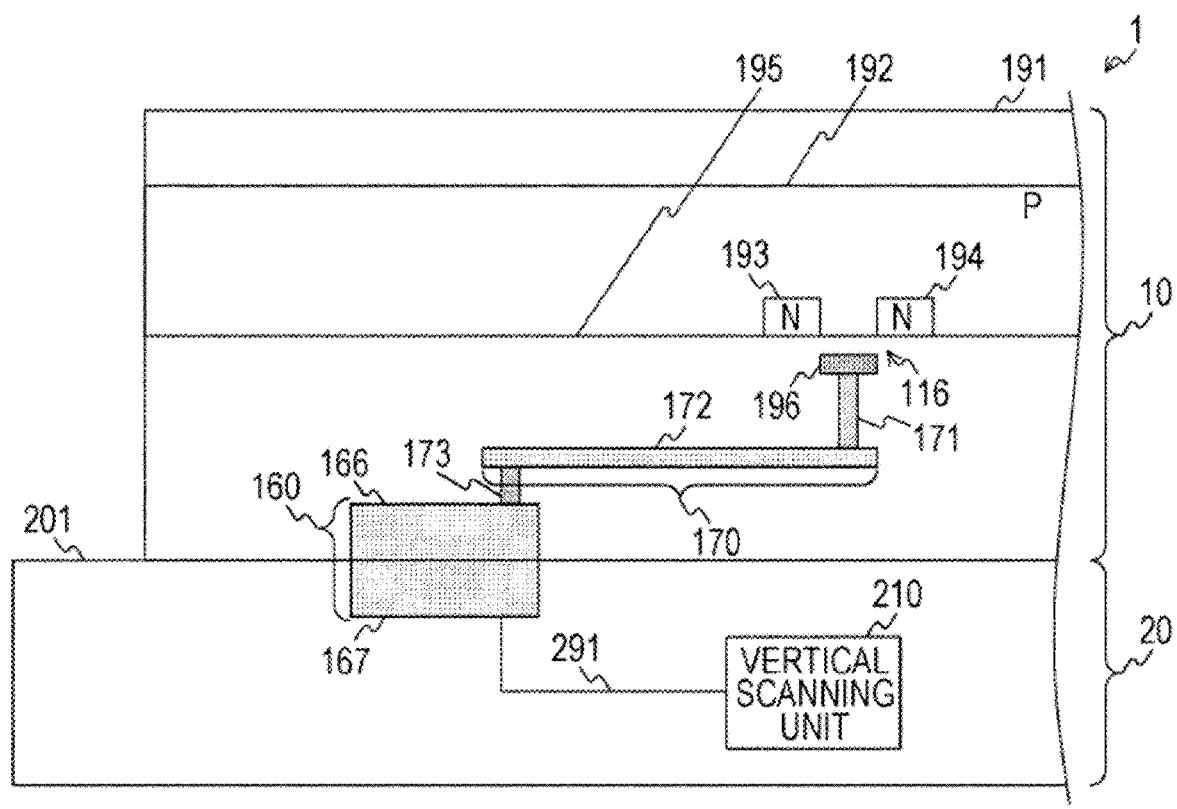

[Fig. 11]
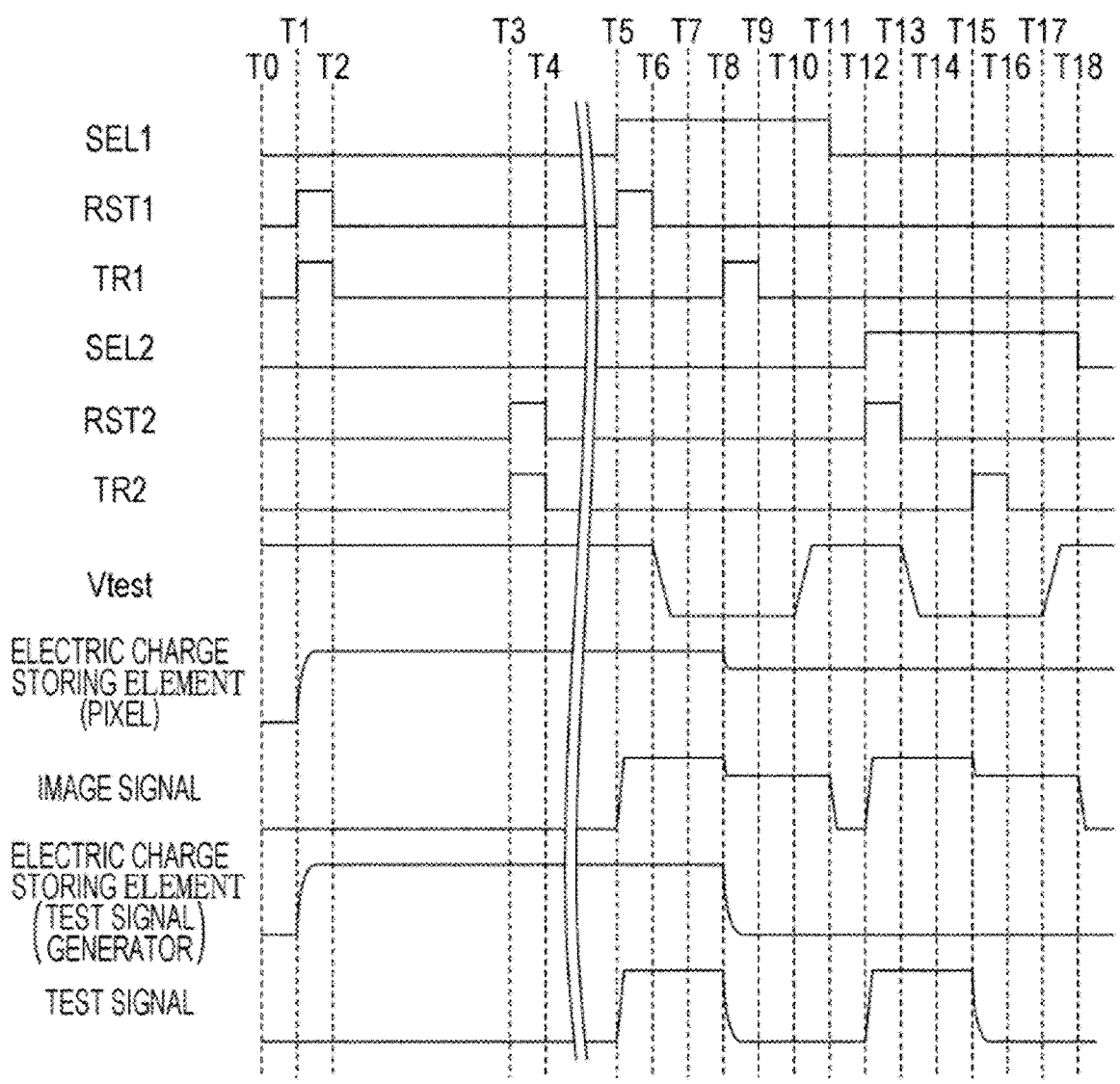

[Fig. 12]
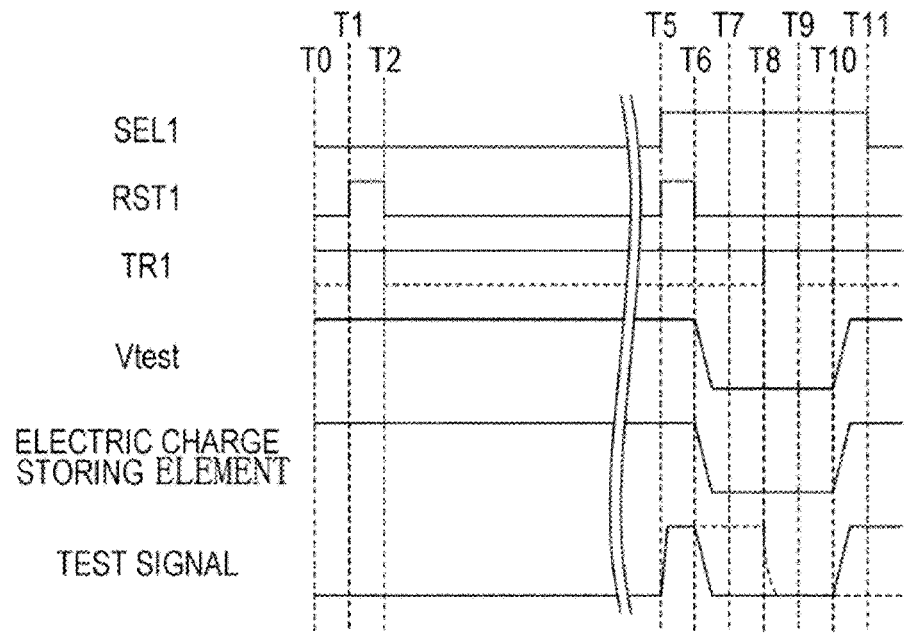
a
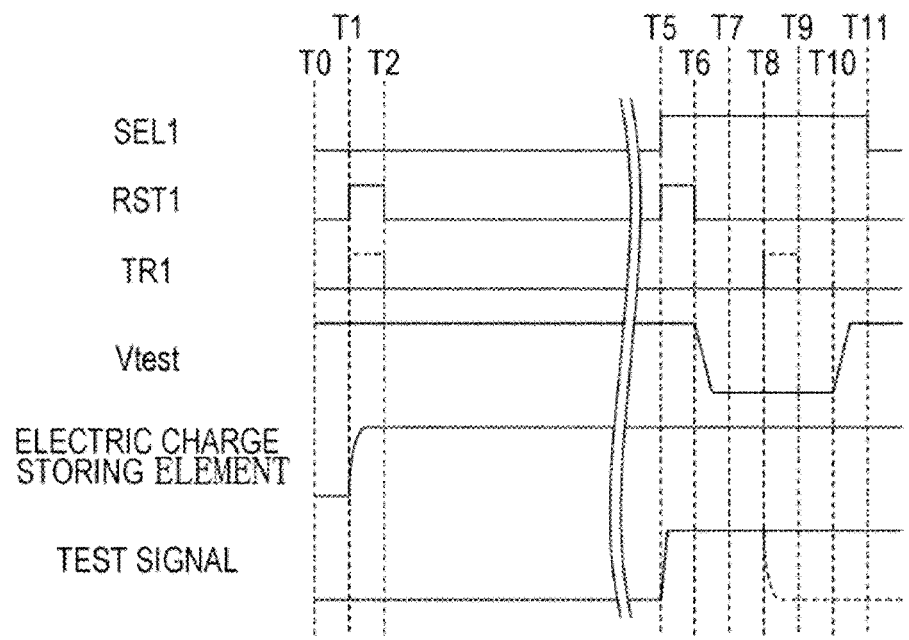
b

[Fig. 13]
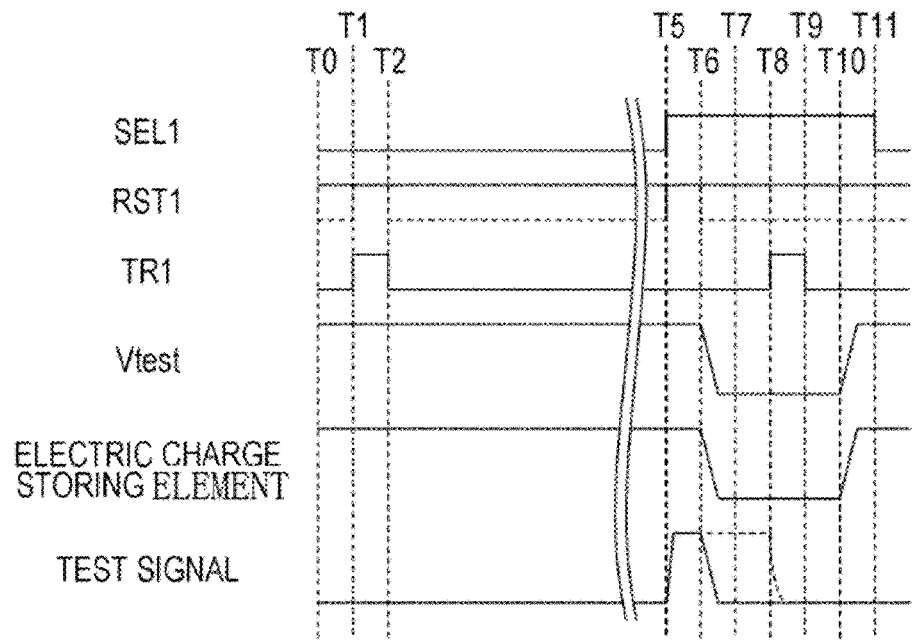
a
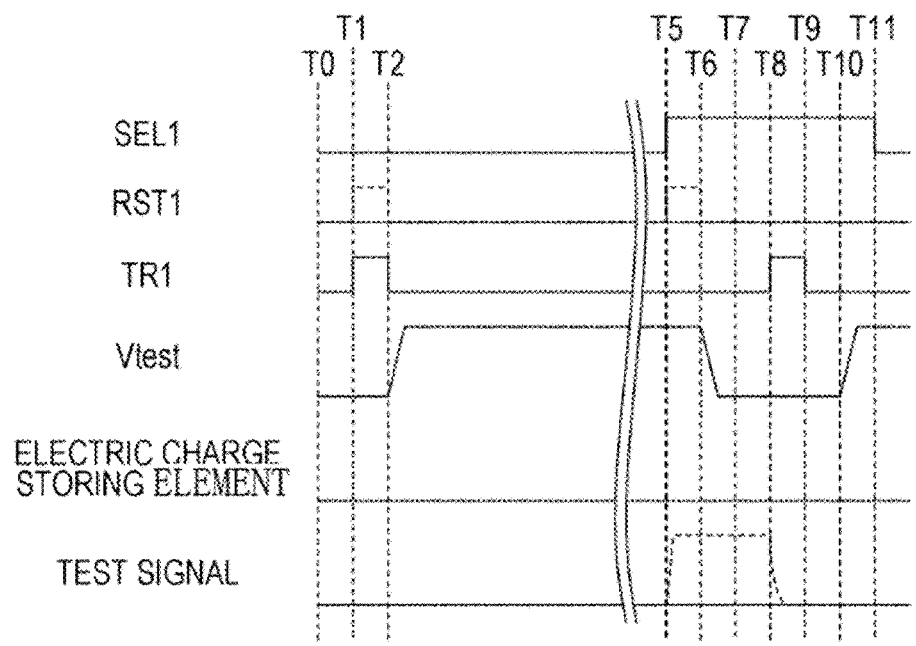
b

[Fig. 14]
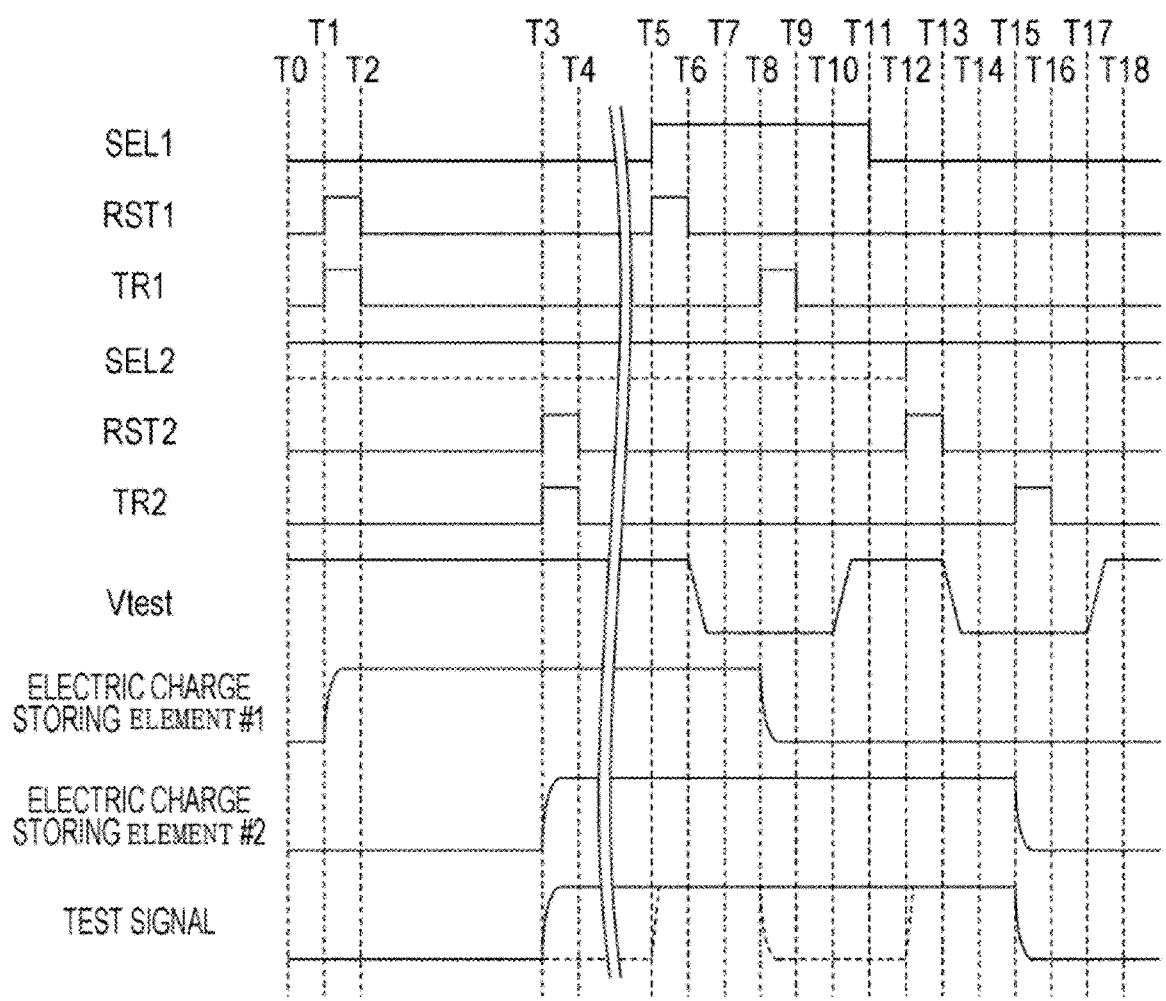

[Fig. 15]
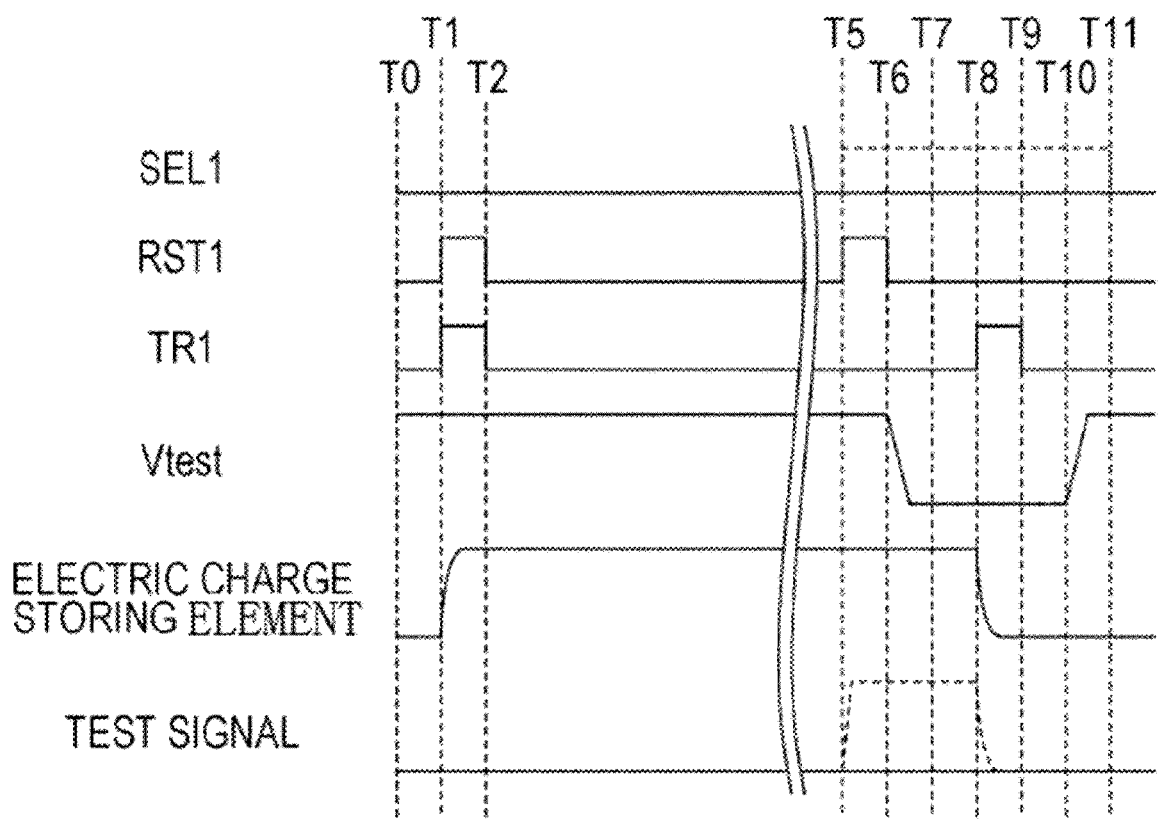

[Fig. 16]
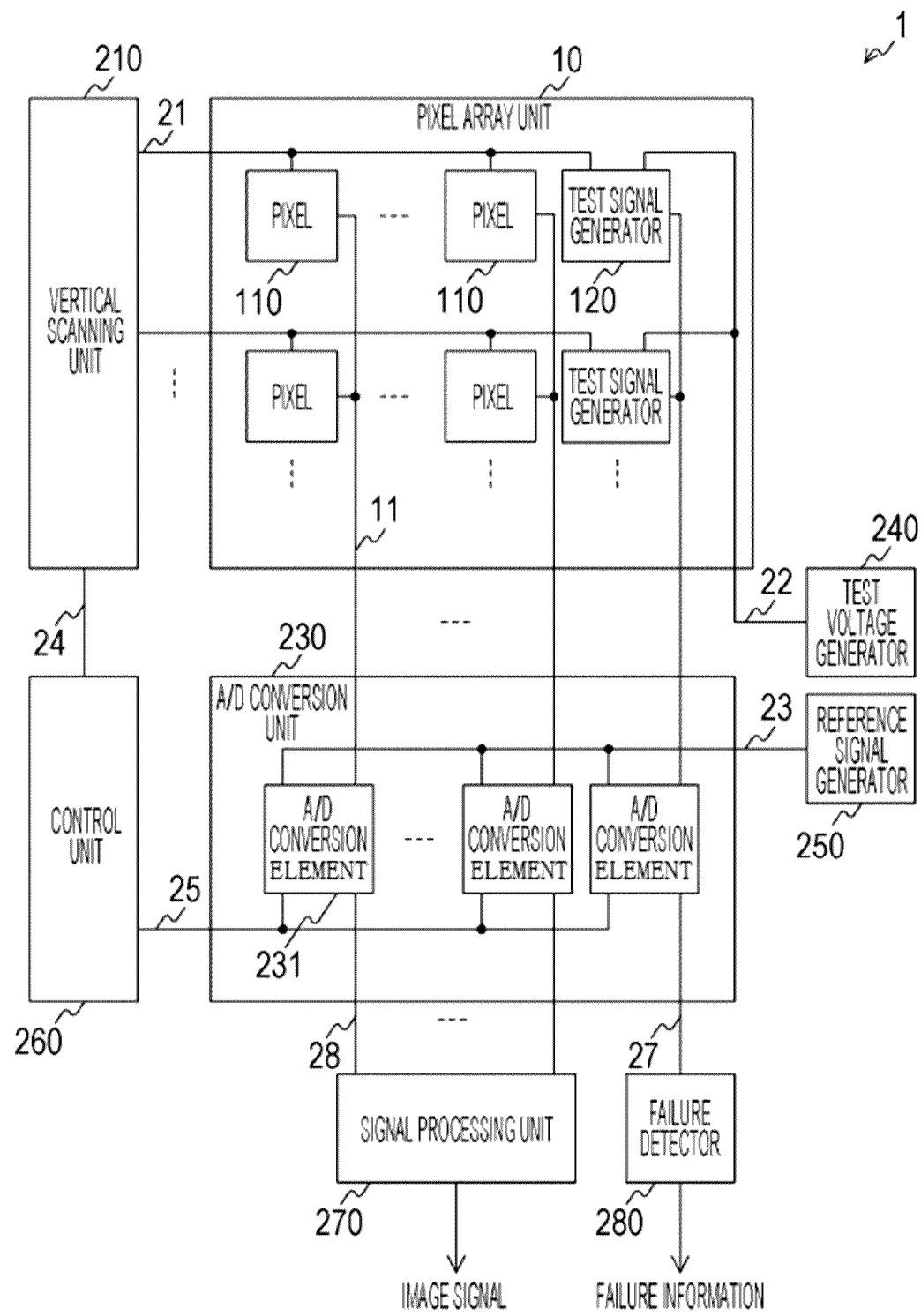

[Fig. 17]
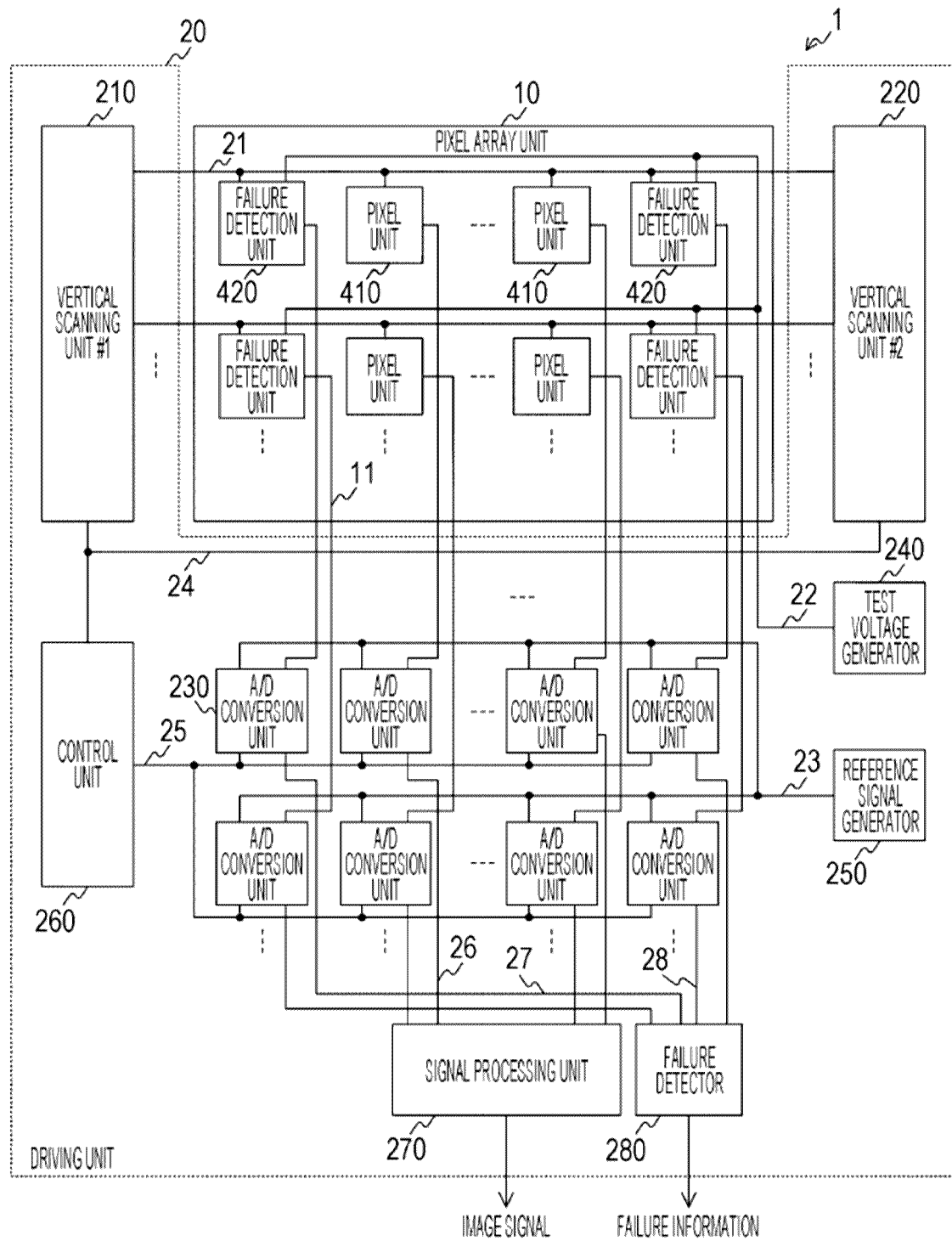

[Fig. 18]
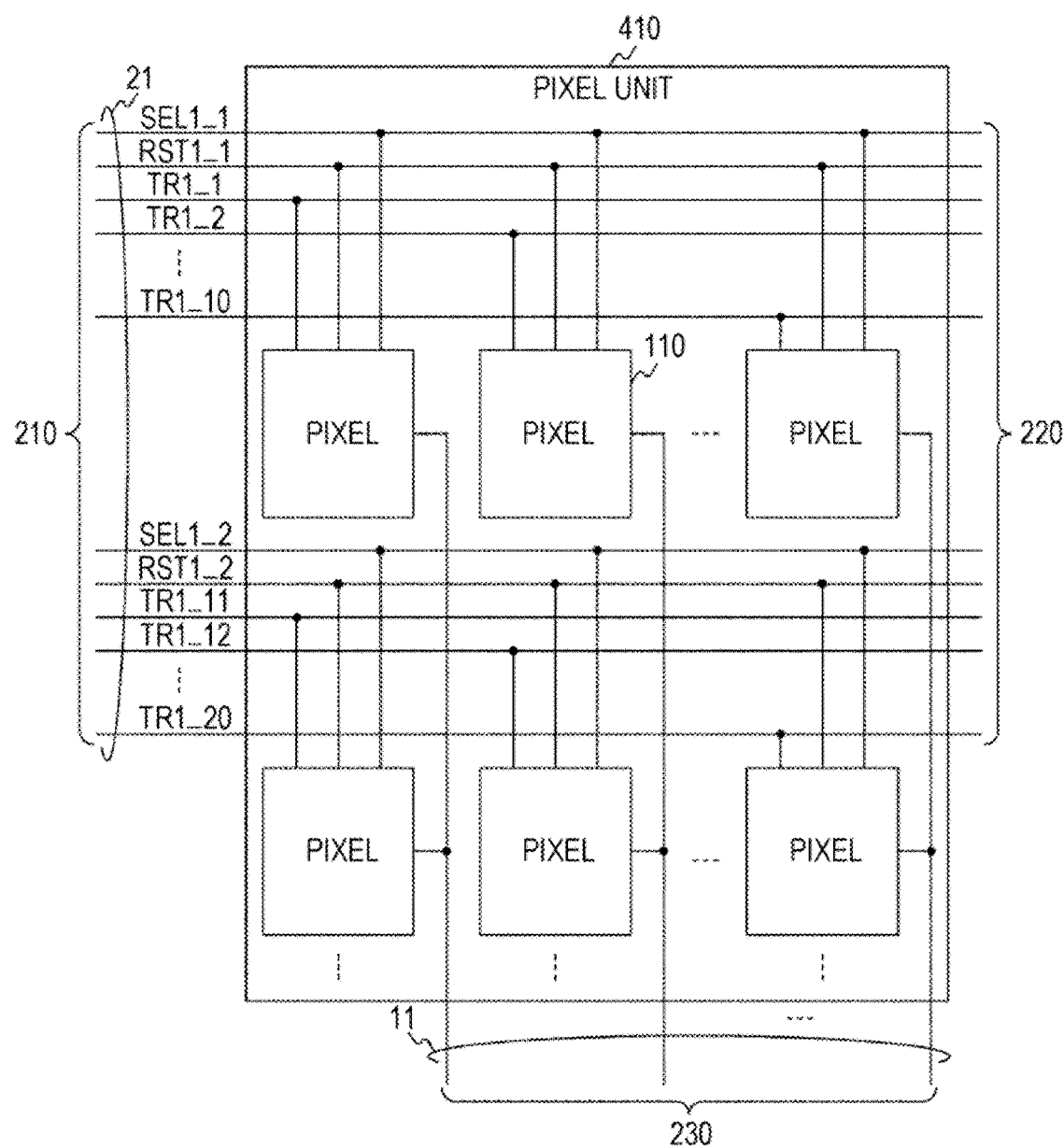

[Fig. 19]
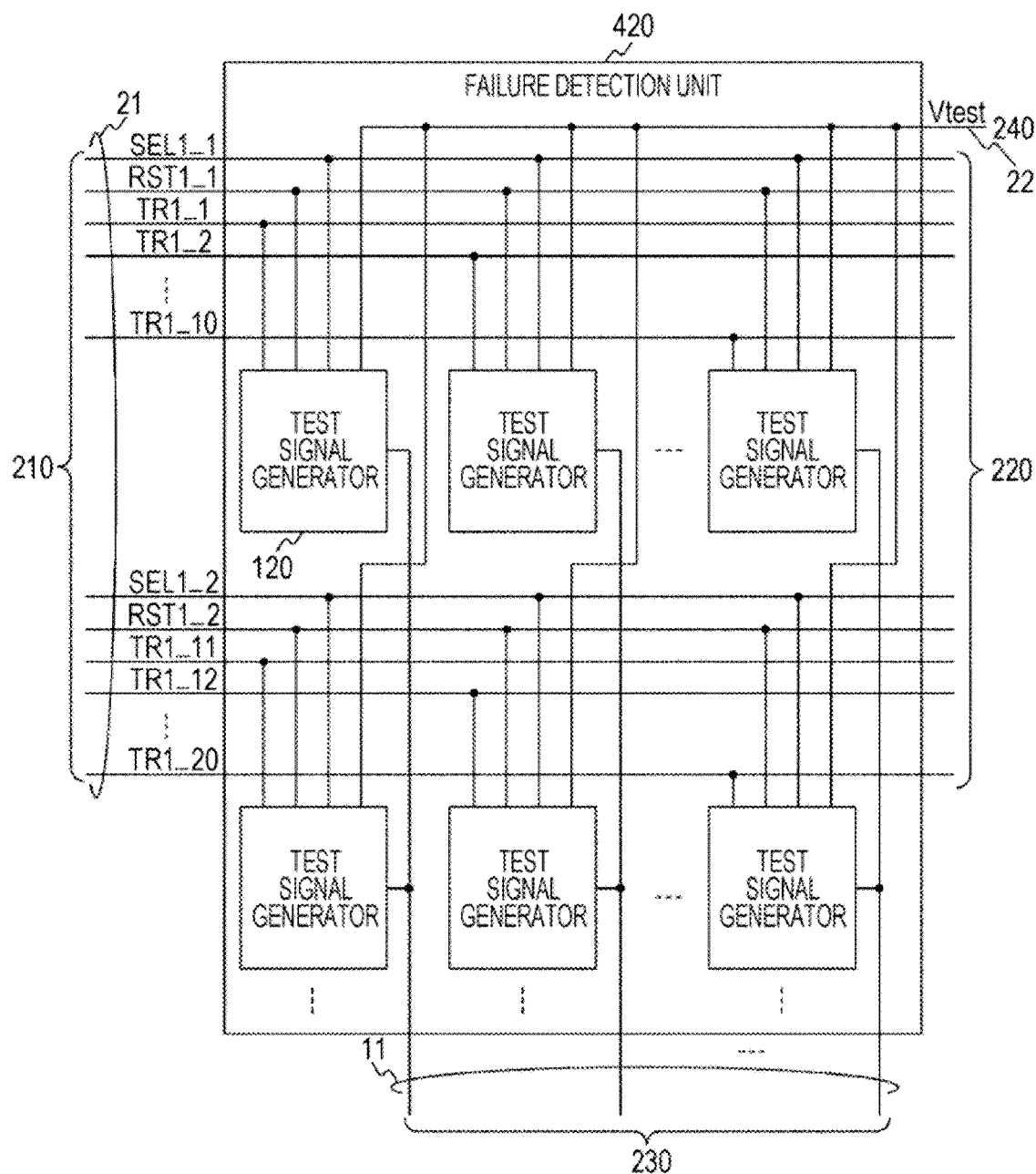

[Fig. 20]
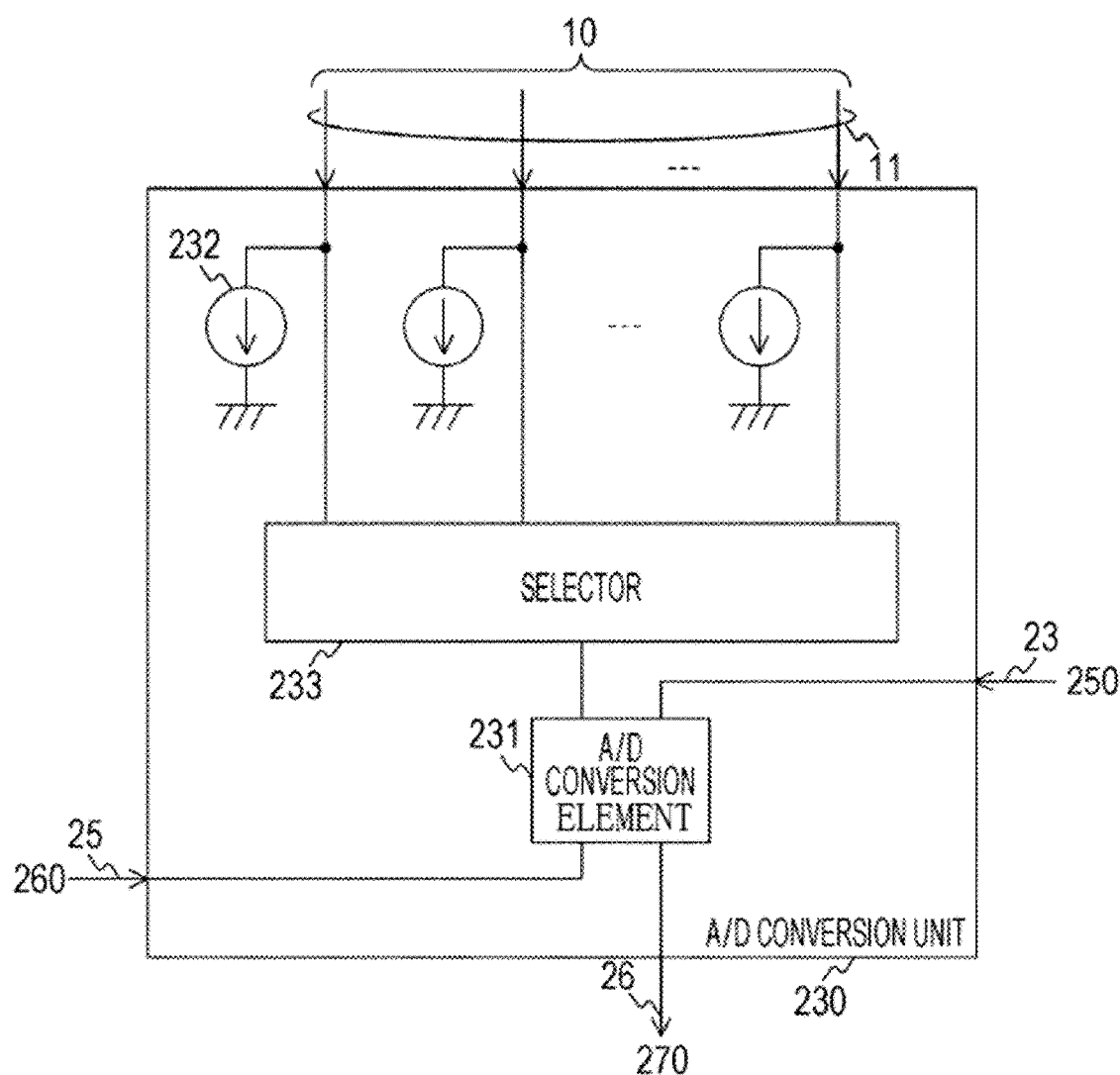

[Fig. 21]
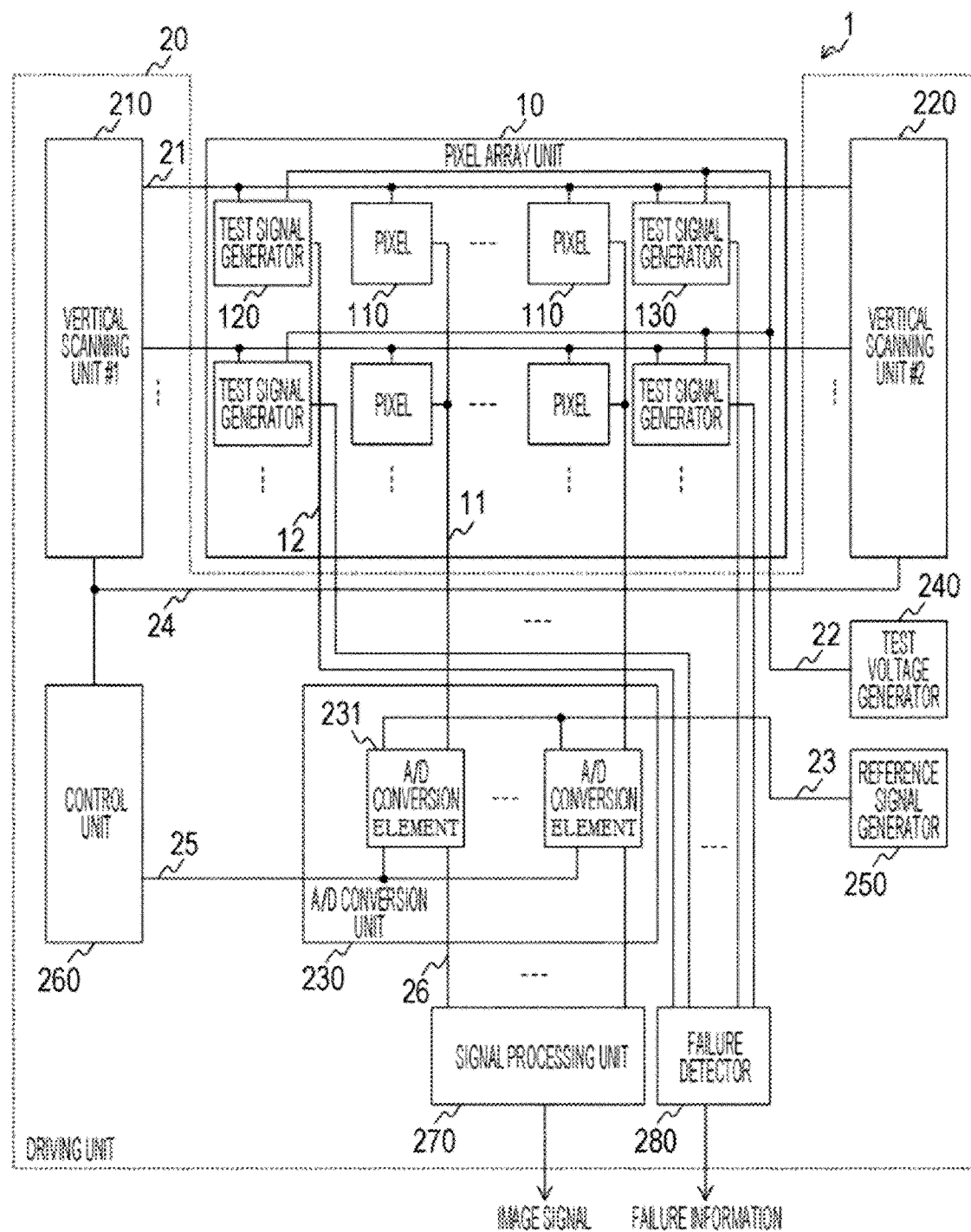

[Fig. 22]
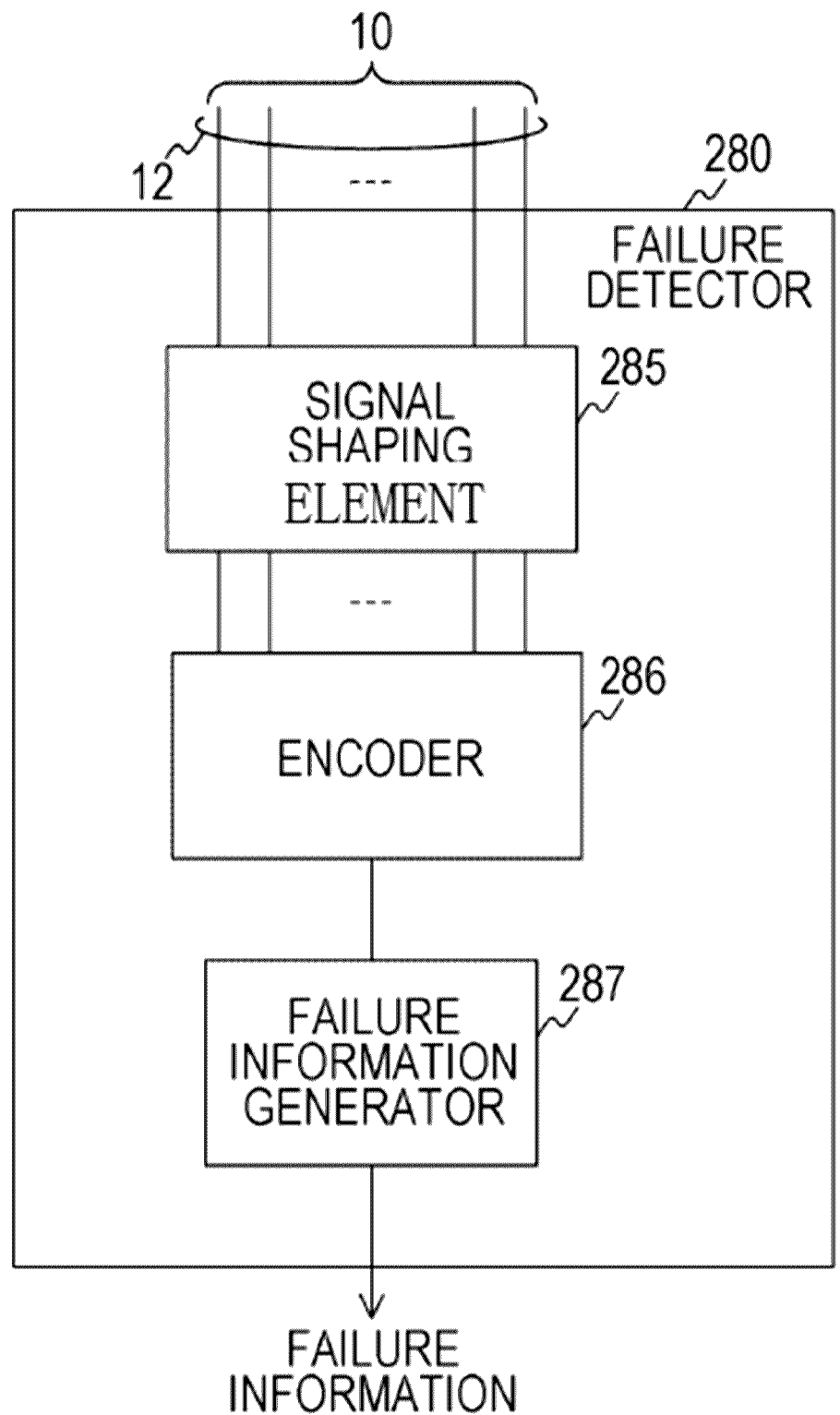

[Fig. 23]
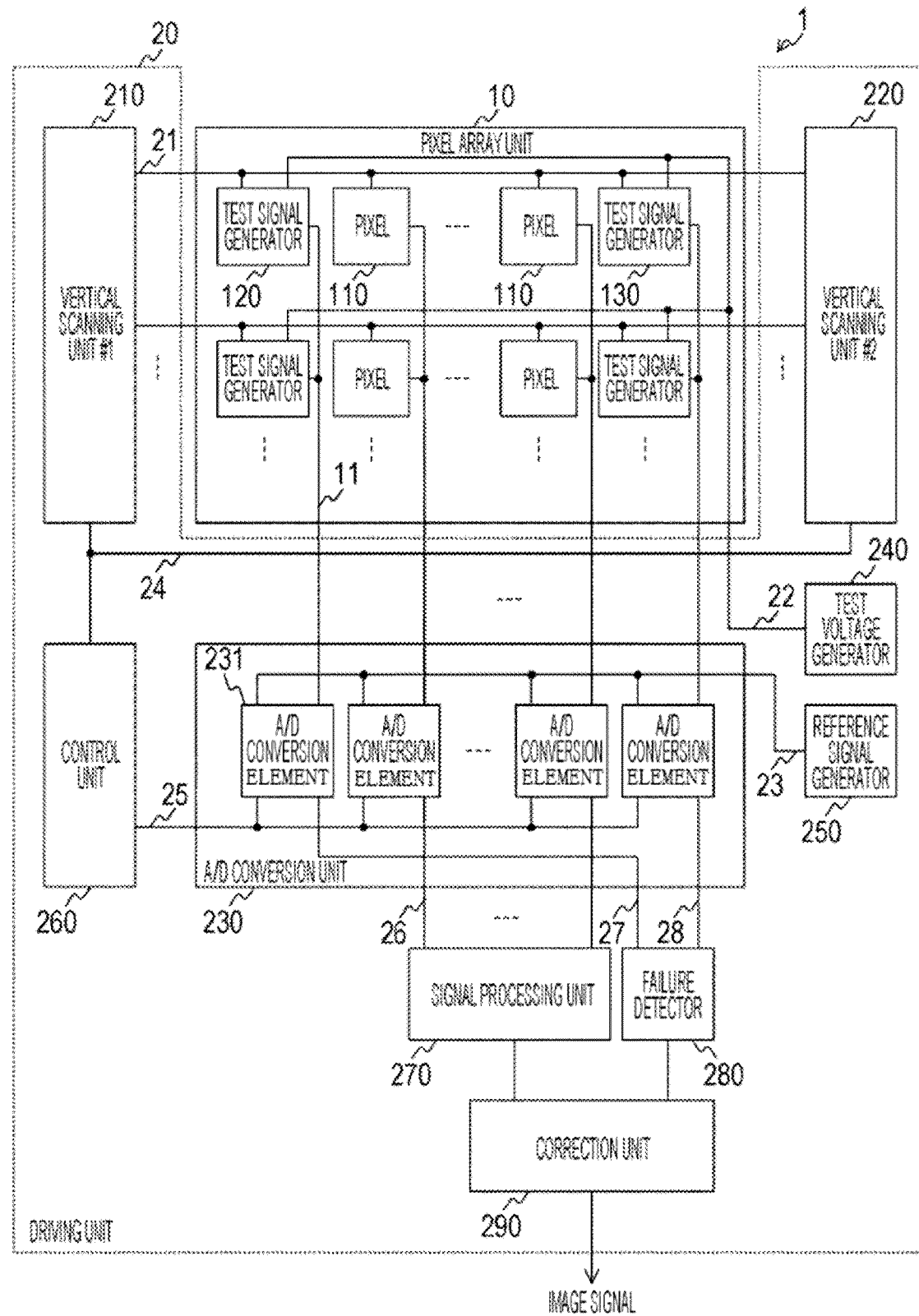

[Fig. 24]
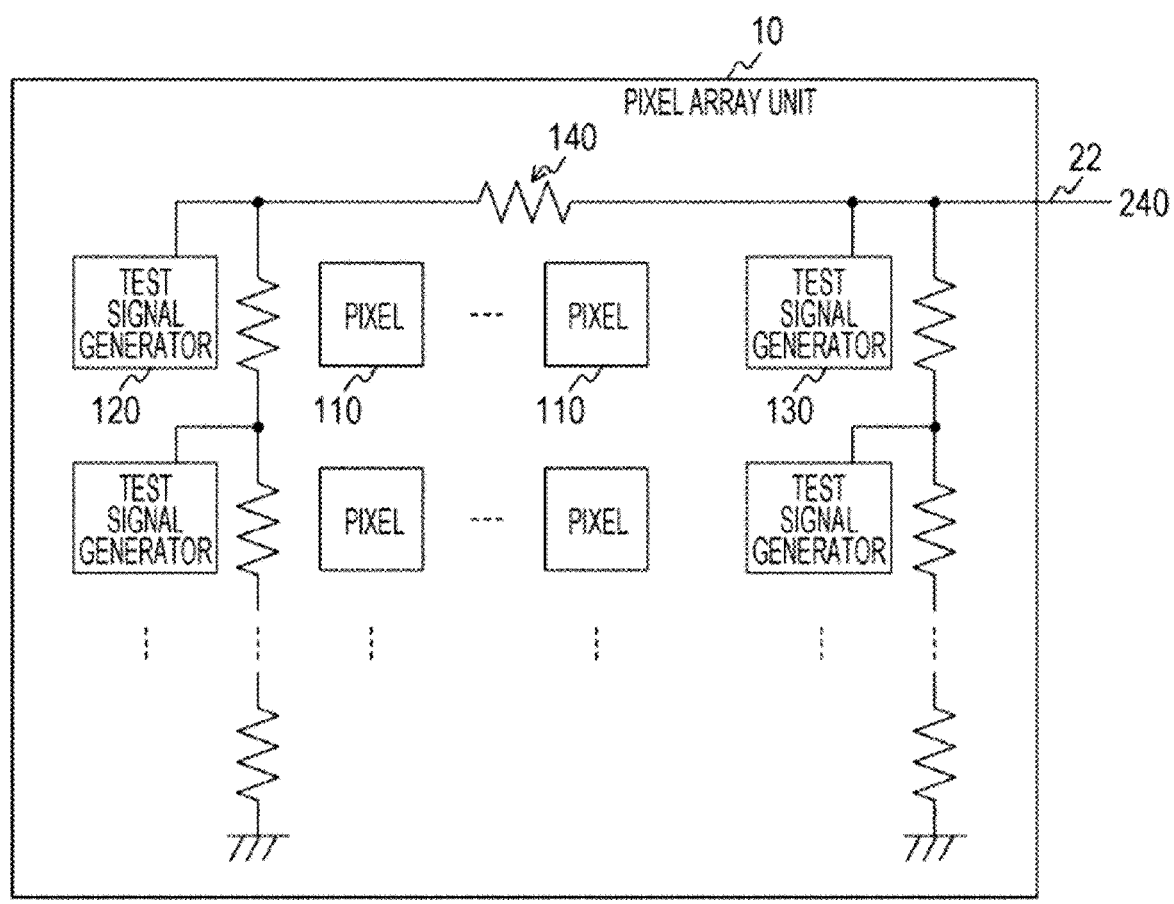

[Fig. 25]
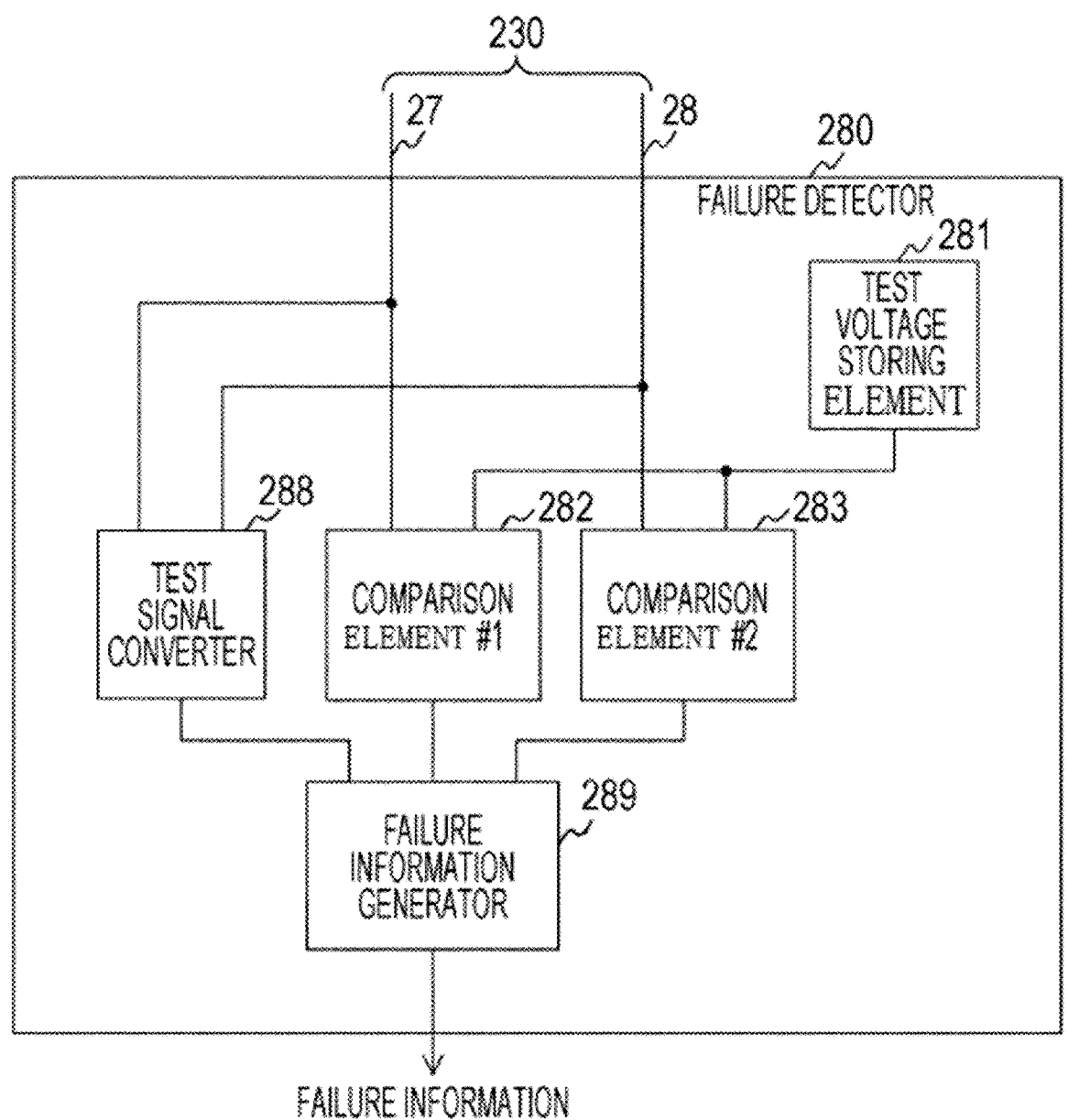

[Fig. 26]
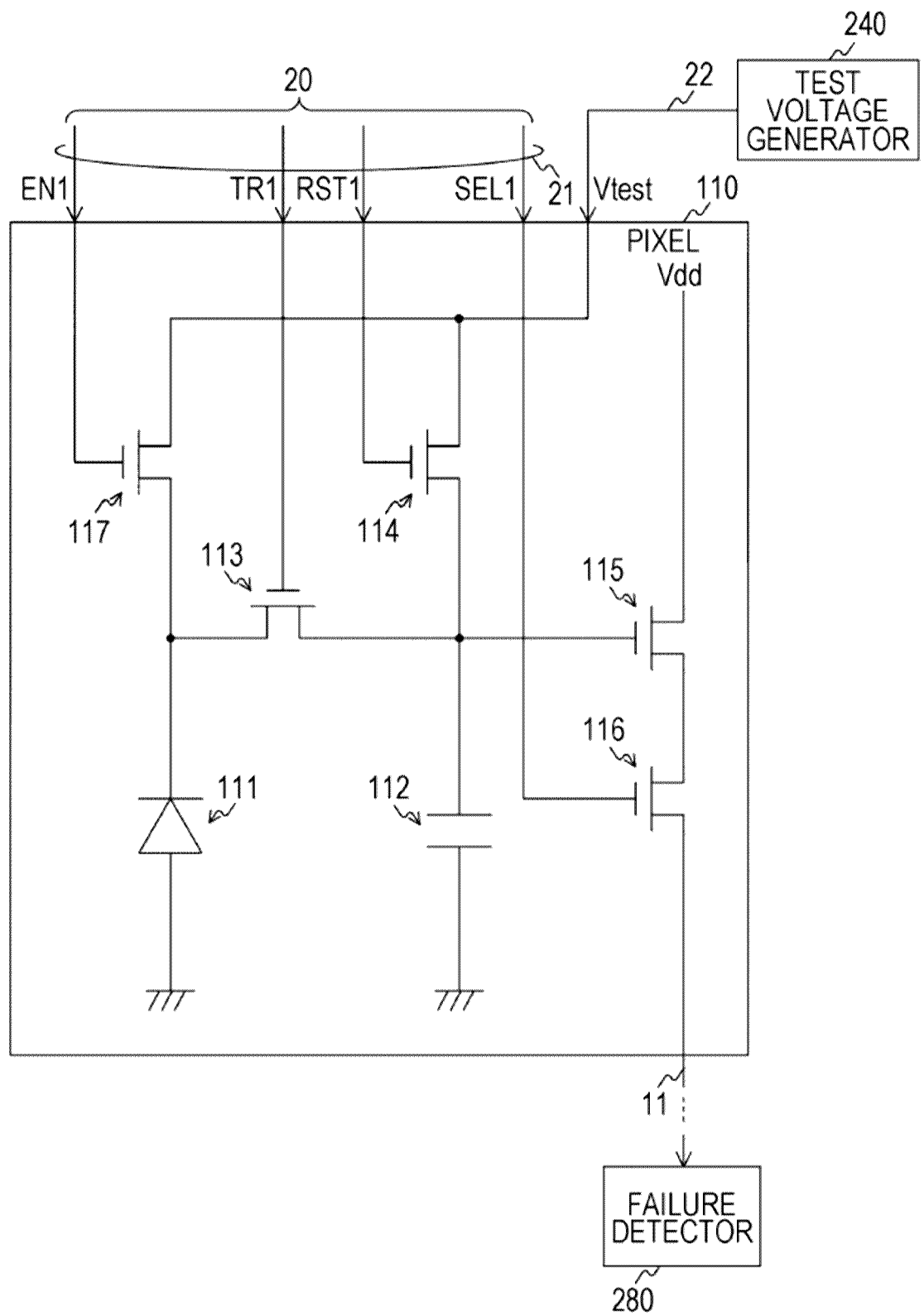

[Fig. 27]
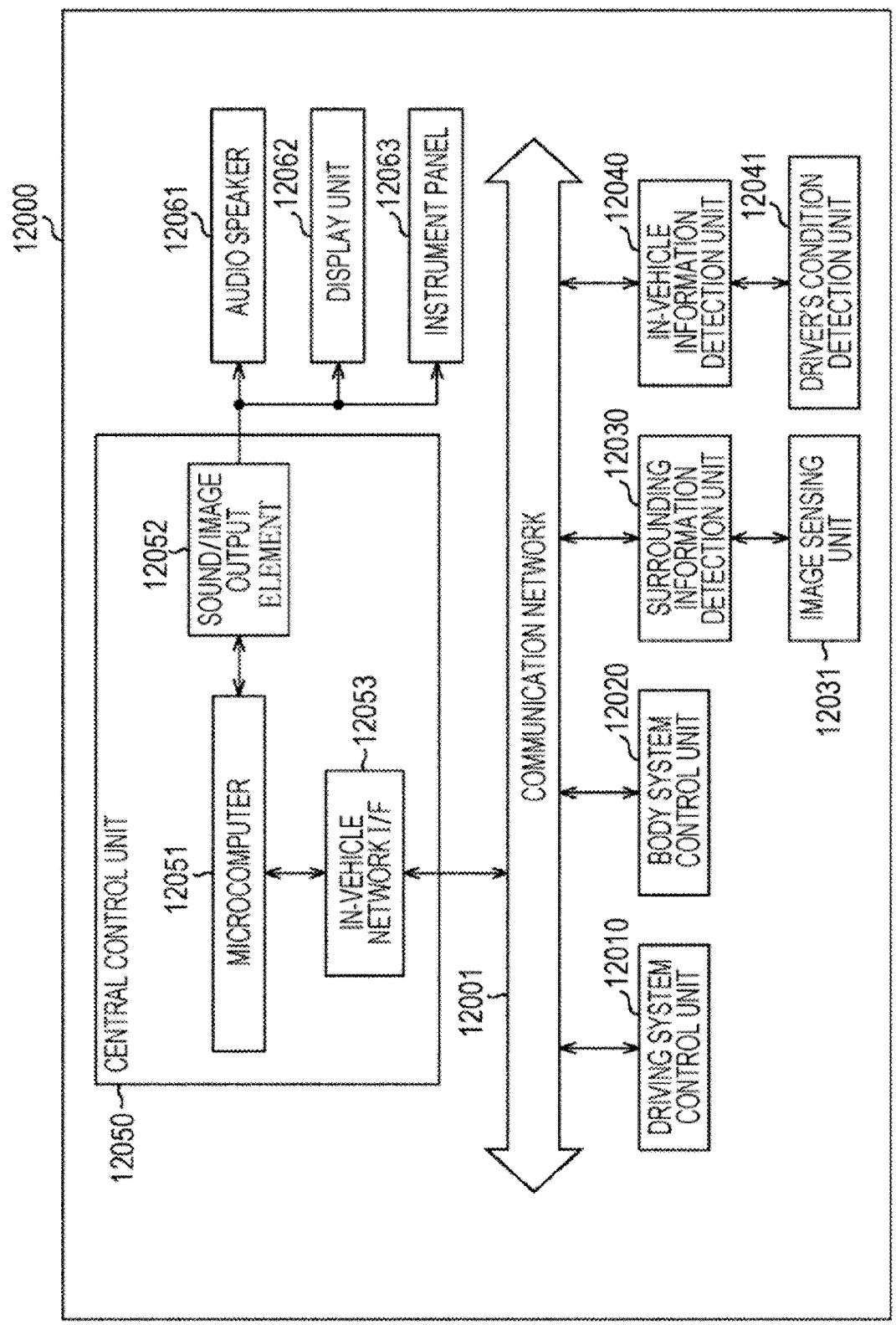

[Fig. 28]
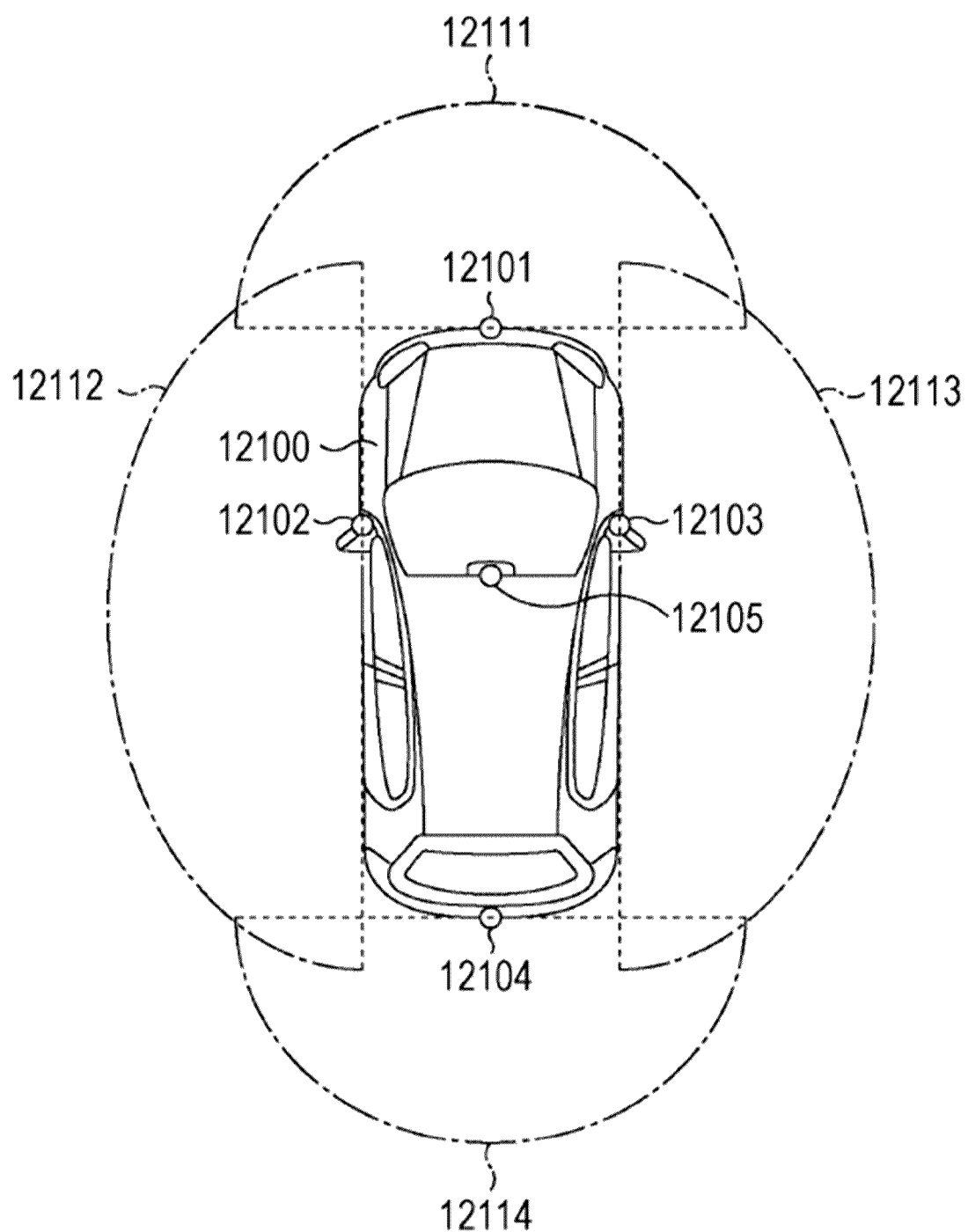

IMAGE SENSOR AND IMAGING DEVICE

CROSS-REFERENCE TO RELATED APPLICATIONS

This application claims the benefit under 35 U.S.C. § 371 as a U.S. National Stage Entry of International Application No. PCT/JP2017/037371, filed in the Japanese Patent Office as a Receiving Office on Oct. 16, 2017, which claims priority to Japanese Patent Application Number JP2016-233875, filed in the Japanese Patent Office on Dec. 1, 2016, each of which is hereby incorporated by reference in its entirety.

TECHNICAL FIELD

The present technology relates to an imaging device, and more particularly, to an imaging device operable to detect a failure of themselves.

BACKGROUND ART

In the related art, a test pixel is employed to detect a failure of itself in an image sensor having a pixel array unit formed by arranging pixels in a matrix shape. For example, an image sensor has been proposed, in which a test for an analog/digital (A/D) converter that converts an image signal output from the pixel array unit into a digital signal is performed by inputting a test voltage generated by the test pixel to the A/D converter (For example, see Patent Literature 1). In this image sensor, the functional test of the A/D converter is performed by generating different test voltages from each test pixel arranged in each row and performing analog/digital conversion for the test voltages.

CITATION LIST

Patent Literature

PTL 1: U.S. Pat. No. 8,823,850

SUMMARY

Technical Problem

In the related art described above, linearity of the A/D converter or the like is tested by comparing a signal subjected to the analog/digital conversion and the test voltage. For this reason, in a case where an abnormal signal is detected during the test, it is difficult to determine which one of the A/D converter or a signal line that transmits a control signal to pixels of the pixel array unit causes an error and detect a failure such as disconnection of the signal line.

The present technology was made in view of the aforementioned circumstances, and it is desirable to detect a failure in a signal line that transmits a control signal to pixels of an image sensor.

Solution to Problem

The present technology was made to deal with the aforementioned circumstances, and a first aspect of the present technology is an image sensor including: An imaging device comprising: a first pixel comprising: a first transfer transistor, wherein a first terminal of the first transfer transistor is coupled to a reference signal generation circuit; a first reset transistor, wherein a first terminal of the first reset transistor is coupled to the reference signal generation circuit; a first amplifier transistor, wherein a gate of the first amplifier transistor is coupled to a second terminal of the first reset transistor and a second terminal of the first transfer transistor; and a first select transistor coupled to the first amplifier transistor; and a second pixel comprising: a first photoelectric conversion element; a second transfer transistor coupled to the first photoelectric conversion element; a second reset transistor configured to receive a first predetermined voltage; a second amplifier transistor coupled to the second transfer transistor and the second reset transistor; and a second select transistor coupled to the second amplifier transistor.

Further, in the first aspect, the test voltage generator may change the test voltage supplied to the test signal generator when the transfer test signal is generated from the transfer test voltage to a voltage different from the transfer test voltage. As a result, it is possible to change the test voltage when the transfer test voltage is generated.

Further, in the first aspect, the failure detector may detect a failure of the transfer control signal line in a case where the transfer test signal has a voltage different from the transfer test voltage. As a result, it is possible to detect a failure in the transfer control signal line in a case where the transfer test signal and the transfer test voltage have different voltages.

Further, in the first aspect, the failure detector may detect a failure of the transfer control signal line in a case where the reset test signal has a voltage different from the reset test voltage. As a result, it is possible to detect a failure in the transfer control signal line in a case where the reset test signal and the reset test voltage are different.

Further, in the first aspect, the failure detector may detect a failure of the reset control signal line in a case where the reset test signal has a voltage different from the reset test voltage. As a result, it is possible to detect a failure in the reset control signal line in a case where the reset test signal and the reset test voltage are different.

Further, in the first aspect, the test voltage generator may supply, as the transfer test voltage, a reset voltage which is a voltage applied to the electric charge storing element in the event of the reset operation. As a result, it is possible to supply the reset voltage as the transfer test voltage.

Further, in the first aspect, the test voltage generator may supply, as the reset test voltage, a voltage ranging within a dynamic range of an image signal depending on the electric charges stored in the electric charge storing element. As a result, it is possible to supply a voltage ranging within a dynamic range of the image signal as the reset test voltage.

Further, in the first aspect, the electric charge storing element may be arranged in a pixel, and an image signal depending on the electric charges stored in the electric charge storing element may be generated from the pixel. As a result, it is possible to generate an image signal depending on electric charges of the electric charge storing element arranged in the pixel.

Further, in the first aspect, the test signal generator may have a capacitor configured to store the test voltage, a signal generation element configured to generate an error signal depending on the test voltage stored in the capacitor, a transfer test signal generator configured to apply the test voltage to the capacitor in response to the transfer control signal to allow the signal generation element to generate the transfer test signal, and a reset control signal generator configured to apply the test voltage to the capacitor in response to the reset control signal to allow the signal generation element to generate the reset test signal. As a result, it is possible to generate the transfer test signal and the reset test signal depending on the test voltage stored in the capacitor.

Further, in the first aspect, the image sensor may further include a pixel selection control signal line configured to transmit, to the pixel, a pixel selection control signal that controls output of the generated image signal from the pixel, in which the test signal generator may output the transfer test signal and the reset test signal in response to the transmitted pixel selection control signal, and the failure detector may further detect a failure of the pixel selection control signal line on the basis of the output transfer test signal and the output reset test signal. As a result, it is possible to detect a failure in the pixel selection control signal line on the basis of the transfer test signal and the reset test signal.

Further, in the first aspect, the failure detector may detect a failure of the pixel selection control signal line in a case where the transfer test signal has a voltage different from the transfer test voltage. As a result, it is possible to detect a failure in the pixel selection control signal line in a case where the transfer test signal and the transfer test voltage are different.

Further, in the first aspect, the failure detector may detect a failure of the pixel selection control signal line in a case where the reset test signal has a voltage different from the reset test voltage. As a result, it is possible to detect a failure in the pixel selection control signal line in a case where the reset test signal and the reset test voltage are different.

Further, in the first aspect, the image sensor may further include a control signal generator configured to generate the transfer control signal and the reset control signal and transmit the transfer control signal and the reset control signal through the transfer control signal line and the reset control signal line, respectively. As a result, it is possible to generate the transfer control signal and the reset control signal using the control signal generator.

Further, in the first aspect, the transfer control signal line may have a signal line commonly connected to the control signal generator, the pixel, and the test signal generator in this order, and the reset control signal line may have a signal line commonly connected to the control signal generator, the pixel, and the test signal generator in this order. As a result, it is possible to arrange the test signal generators in end elements of the transfer control signal line and the reset control signal line.

Further, in the first aspect, the image sensor may further include: a second control signal generator configured to generate the transfer control signal and the reset control signal; and a second test signal generator configured to generate the transfer test signal and the reset test signal, in which the transfer control signal line may have a signal line commonly connected to the control signal generator, the test signal generator, the pixel, the second test signal generator, and the second control signal generator in this order, and the reset control signal line may have a signal line commonly connected to the control signal generator, the test signal generator, the pixel, the second test signal generator, and the second control signal generator in this order. As a result, it is possible to arrange the test signal generators in both end elements of the transfer control signal line and the reset control signal line.

Further, in the first aspect, the pixels may be arranged in a matrix shape, the test signal generator may be arranged in each row, the transfer control signal line may be arranged each row to transmit the transfer control signal to the pixel and the test signal generator, the reset control signal line may be arranged in each row to transmit the reset control signal to the pixel and the test signal generator, and the failure detector may detect a failure in a plurality of the transfer control signal lines and a plurality of the reset control signal lines on the basis of the transfer test signal output from a plurality of the test signal generators and the reset test signal output from a plurality of the test signal generators. As a result, it is possible to detect a failure in the transfer control signal line and the reset control signal line arranged in each row using the test signal generated from the test signal generators arranged in each row.

Further, in the first aspect, the image sensor may further include a failure information generator configured to generate failure information as information on the failed row in which at least one of the transfer control signal lines and the reset control signal lines is failed on the basis of a result of the detection of the failure detector. As a result, it is possible to create information on a failed row as the failure information.

Further, in the first aspect, the image sensor may further include a correction unit configured to correct the output image signal on the basis of the generated failure information. As a result, it is possible to correct the image signal of the failed row.

Further, in the first aspect, the control signal generator may be formed in a semiconductor chip different from that in which the pixel and the test signal generator are formed, the transfer control signal line may transmit the transfer control signal between the different semiconductor chips through a connection terminal, and the reset control signal line may transmit the reset control signal between the different semiconductor chips through a connection terminal. As a result, it is possible to transmit the transfer control signal and the reset control signal through the connection terminal arranged between different semiconductor chips.

Further, a second aspect of the present technology is an imaging device including: an electric charge storing element configured to store a transferred electric charge; a transfer control signal line configured to transmit a transfer control signal that controls a transfer of the electric charges generated in response to emitted light to the electric charge storing element; a reset control signal line configured to transmit, to the pixel, a reset control signal that controls a reset operation of the electric charge stored in the electric charge storing element; a test signal generator configured to generate a transfer test signal on the basis of a test voltage for detecting a failure in the transfer control signal line and the reset control signal line and the transmitted transfer control signal and generate a reset test signal on the basis of the test voltage and the transmitted reset control signal; a test voltage generator configured to supply a transfer test voltage to the test signal generator as the test voltage when the transfer test signal is generated and supply a reset test voltage to the test signal generator as the test voltage when the reset test signal is generated; a failure detector configured to detect a failure in the transfer control signal line and the reset control signal line on the basis of the generated transfer test signal and the generated reset test signal; and a processing circuit configured to process an image signal generated depending on the electric charge stored in the electric charge storing element. As a result, it is possible to supply different test voltages when the transfer test signal is generated and when the reset test signal is generated.

According to an embodiment of the present technology, it is possible to detect a failure in the signal line that transmits the control signal to the pixels of the image sensor. Note that the effects of the present technology are not necessarily limited to those described herein, but may include anything of this disclosure. [Advantageous Effects of Invention]

According to an embodiment of the present technology, it is possible to detect a failure in the signal line that transmits the control signal to the pixels of the image sensor. Note that the effects of the present technology are not necessarily limited to those described herein, but may include anything of this disclosure.

BRIEF DESCRIPTION OF DRAWINGS

FIG. 1 is a diagram illustrating an exemplary configuration of an imaging device 1 according to a first embodiment of the present technology.

FIG. 2 is a diagram illustrating an exemplary configuration of a pixel 110 according to the first embodiment of the present technology.

FIG. 3 is a diagram illustrating an exemplary configuration of a test signal generator 120 according to the first embodiment of the present technology.

FIG. 4 is a diagram illustrating an exemplary configuration of a vertical scanning unit 210 according to an embodiment of the present technology.

FIG. 5 is a diagram illustrating an exemplary configuration of an A/D conversion unit 230 according to the first embodiment of the present technology.

FIG. 6 is a diagram illustrating an exemplary configuration of an A/D conversion element 231 according to an embodiment of the present technology.

FIG. 7 is a diagram illustrating an exemplary configuration of a failure detector 280 according to the first embodiment of the present technology.

FIG. 8 is a diagram illustrating exemplary configurations of a pixel array unit 10 and a driving unit 20 according to an embodiment of the present technology.

FIG. 9 is a diagram illustrating an exemplary configuration of a connection terminal 160 according to an embodiment of the present technology.

FIG. 10 is a diagram illustrating another exemplary configuration of the connection terminal 160 according to an embodiment of the present technology.

FIG. 11 is a diagram illustrating an example in which an image signal and a test signal are generated according to an embodiment of the present technology.

FIG. 12 is a diagram illustrating an example of the test signal when a transfer control signal line is failed according to an embodiment of the present technology.

FIG. 13 is a diagram illustrating an example of the test signal when a reset control signal line is failed according to an embodiment of the present technology.

FIG. 14 is a diagram illustrating an example of the test signal when a pixel selection control signal line is failed according to an embodiment of the present technology.

FIG. 15 is a diagram illustrating another example of the test signal when the pixel selection control signal line is failed according to an embodiment of the present technology.

FIG. 16 is a diagram illustrating an exemplary configuration of an imaging device 1 according to a second embodiment of the present technology.

FIG. 17 is a diagram illustrating an exemplary configuration of an imaging device 1 according to a third embodiment of the present technology.

FIG. 18 is a diagram illustrating an exemplary configuration of a pixel unit 410 according to the third embodiment of the present technology.

FIG. 19 is a diagram illustrating an exemplary configuration of a failure detection unit 420 according to the third embodiment of the present technology.

FIG. 20 is a diagram illustrating an exemplary configuration of an A/D conversion unit 230 according to the third embodiment of the present technology.

FIG. 21 is a diagram illustrating an exemplary configuration of an imaging device 1 according to a fourth embodiment of the present technology.

FIG. 22 is a diagram illustrating an exemplary configuration of a failure detector 280 according to the fourth embodiment of the present technology.

FIG. 23 is a diagram illustrating an exemplary configuration of an imaging device 1 according to a fifth embodiment of the present technology.

FIG. 24 is a diagram illustrating an exemplary configuration of a pixel array unit 10 according to a sixth embodiment of the present technology.

FIG. 25 is a diagram illustrating an exemplary configuration of a failure detector 280 according to the sixth embodiment of the present technology.

FIG. 26 is a diagram illustrating an exemplary configuration of a pixel 110 according to a seventh embodiment of the present technology.

FIG. 27 is a block diagram schematically illustrating an exemplary configuration of a vehicle control system.

FIG. 28 is an explanatory diagram illustrating an exemplary installation position of an image sensing unit.

DESCRIPTION OF EMBODIMENTS

Examples for embodying the present technology (hereinafter, referred to as "embodiments") will now be described. The description will be made in the following sequence.

1. First Embodiment (in a case where an image sensor includes a plurality of semiconductor chips)
2. Second Embodiment (in a case where an image sensor includes a single semiconductor chip)
3. Third Embodiment (in a case where a pixel array unit includes a plurality of pixel units)
4. Fourth Embodiment (in a case where analog/digital conversion of a test signal is omitted)
5. Fifth Embodiment (in a case where an image signal of a failed row is corrected)
6. Sixth Embodiment (in a case where a test voltage is generated for each row)
7. Seventh Embodiment (in a case where a failure of the signal line is detected from a pixel)

1. First Embodiment

Configuration of Imaging Device

FIG. 1 is a diagram illustrating an exemplary configuration of the imaging device 1 according to the first embodiment of the present technology. The imaging device 1 includes a pixel array unit 10 and a driving unit 20. In addition, the driving unit 20 includes a vertical scanning unit #1 (210), a vertical scanning unit #2 (220), an A/D conversion unit 230, a test voltage generator 240, a reference signal generator 250, a control unit 260, a signal processing unit 270, and a failure detector 280.

The pixel array unit 10 is configured by arranging pixels 110 that generate image signals in response to emitted light in a matrix shape. In addition, a signal line 21 as a signal line that transmits a control signal to the pixels 110 is arranged in each row of the pixel array unit 10 and is wired commonly between the pixels 110 arranged in each row. As described below, the signal line 21 includes a transfer control signal line that transmits a transfer control signal, a reset control signal line that transmits a reset control signal, and a pixel selection control signal line that controls image signals output from the pixels 110. In addition, a signal line 11 for transmitting the image signals generated from the pixels 110 is arranged in each column of the pixel array unit 10 and is wired commonly between the pixels 110 arranged in each column.

In addition, test signal generators 120 and 130 that generate test signals for detecting a failure of the signal line 21 are arranged in each row of the pixel array unit 10. The test signal generators 120 and 130 are arranged in both ends of each row, and the signal lines 11 and 21 are wired in a similar manner to that of the pixels 110. In addition, a signal line 22 that transmits the test voltage is further wired to the test signal generators 120 and 130. Here, the test voltage refers to a signal for detecting a failure in the transfer control signal line and the reset control signal line described above. The test signal generators 120 and 130 generate a transfer test signal and a reset test signal as the test signals. The transfer test signal is generated on the basis of the test voltage and the transfer control signal, and the reset test signal is generated on the basis of the test voltage and the reset control signal. Configurations of the pixels 110, the test signal generator 120, and the like will be described below in more details. Note that the test signal generator 130 is an example of a second test signal generator described in the claims.

A vertical scanning unit #1 (210) and a vertical scanning unit #2 (220) generate control signals for the pixels 110 and output the control signals through the signal line 21. The vertical scanning units #1 (210) and #2 (220) generate the transfer control signal, the reset control signal, and the pixel selection control signal described above as the control signals. In addition, the vertical scanning units #1 (210) and #2 (220) generate the same control signal and output it to the signal line 21 at the same time in order to provide redundancy in generation of the control signal. Configurations of the vertical scanning units #1 (210) and #2 (220) will be described below in more details. Note that the vertical scanning unit #1 (210) is an example of a control signal generator described in the claims. The vertical scanning unit #2 (220) is an example of a second control signal generator described in the claims.

The A/D conversion unit 230 converts an image signal generated from the pixel 110 into a digital image signal. The A/D conversion unit 230 has A/D conversion elements 231 arranged in each column of the pixel array unit 10 to perform analog/digital conversion, and a signal line 11 is wired to each A/D conversion element 231. In addition, the A/D conversion unit 230 further has an A/D conversion element 231 arranged to perform analog/digital conversion for a test signal generated from the test signal generators 120 or the like. The digital image signal generated through the analog/digital conversion is output to the signal processing unit 270. Meanwhile, the digital test signal is output to the failure detector 280. The configuration of the A/D conversion unit 230 will be described below in more details.

The test voltage generator 240 generates a test voltage and outputs the test voltage to the test signal generators 120 and 130 through a signal line 22. The test voltage generator 240 generates a transfer test voltage and a reset test voltage as the test voltage. The transfer test voltage and the reset test voltage are test voltages having different voltages. The transfer test voltage is a test voltage generated when the transfer test signal is generated by the test signal generators 120 or the like. The reset test voltage is a test voltage generated when the reset test signal is generated by the test signal generators 120 or the like. The test voltage will be described below in more details.

The reference signal generator 250 generates a reference signal and outputs the reference signal to the A/D conversion unit 230. The reference signal is output through a signal line 23. As this reference signal, a signal having a voltage decreasing in a ramp shape may be employed. The reference signal generator 250 starts generation of the reference signal in synchronization with a start of the analog/digital conversion of the A/D conversion element 231 as described below.

The control unit 260 controls the entire imaging device 1. The control unit 260 generates a common control signal for controlling the vertical scanning units #1 (210) and #2 (220) and outputs the control signal to the vertical scanning units #1 (210) and #2 (220) through a signal line 24. In addition, the control unit 260 generates a common control signal for controlling the A/D conversion elements 231 arranged in the A/D conversion unit 230 and outputs the control signal to all of the A/D conversion elements 231 through a signal line 25.

The failure detector 280 detects a failure of the signal line 21 on the basis of an error signal output from the test signal generator 120 or the like. The failure detector 280 detects a failure in a transfer test signal line, a reset test signal line, and a pixel selection control signal line on the basis of the transfer test signal and the reset test signal. Detection of a failure may be performed by comparing the test signal output from the test signal generator 120 or the like with a normal test signal. The configuration of the failure detector 280 will be described below in more details.

In the imaging device 1 of FIG. 1, the pixel array unit 10 and the driving unit 20 are formed in different semiconductor chips. The pixel array unit 10 operates at a relatively high power voltage in order to produce an image signal. Meanwhile, the driving unit 20 performs a digital signal processing. For this reason, the driving unit 20 necessitates a high speed processing and is supplied with a relatively low power voltage. In this manner, the pixel array unit 10 and the driving unit 20 are formed from circuits having different properties. In this regard, the pixel array unit 10 and the driving unit 20 are separately formed on each of semiconductor chips manufactured through appropriate processes. Then, the semiconductor chips are bonded to each other to form the imaging device 1. As a result, it is possible to improve cost performance of the imaging device 1. In this case, the signal lines 11, 21, and 22 perform signal transmission between different semiconductor chips.

Note that the pixel array unit 10, the vertical scanning units #1 (210) and #2 (220), the A/D conversion unit 230, the test voltage generator 240, the reference signal generator 250, the control unit 260, and the failure detector 280 constitute an image sensor.

The signal processing unit 270 processes the digital image signal output from the A/D conversion element 231. Through this processing, for example, horizontal transmission can be performed, in which the digital image signals output from a plurality of A/D conversion elements 231 are sequentially transmitted. Note that the signal processing unit 270 is an example of the processing circuit described in the claims.

Configuration of Pixel

FIG. 2 is a diagram illustrating an exemplary configuration of the pixel 110 according to the first embodiment of the present technology. In FIG. 2, a pixel 110 arranged in the first row of the pixel array unit 10 is illustrated by way of example. The pixel 110 includes a photoelectric conversion element 111, an electric charge storing element 112, an electric charge transfer element 113, a reset element 114, a signal generation element 115, and a signal output element 116. Note that an N-channel metal oxide semiconductor (MOS) transistor may be employed in the electric charge transfer element 113, the reset element 114, the signal generation element 115, and the signal output element 116. The electric charge transfer element 113, the reset element 114, and the signal output element 116 can be electrically connected to each other by applying a voltage equal to or higher than a threshold voltage between a source and a gate of the MOS transistor. This signal having a voltage equal to or higher than the threshold value will be referred to as an "ON" signal.

In addition, the signal lines 21 and 11 are wired to the pixel 110. The signal line 21 includes three signal lines including a transfer control signal line TR (Transfer), a reset control signal line RST (Reset), and a pixel selection control signal line SEL (select). The transfer control signal line TR is a signal line that transmits a transfer control signal as a signal for controlling transfer of electric charges in the electric charge transfer element 113 as described below. The reset control signal line RST is a signal line that transmits a reset control signal as a signal for controlling a reset operation in the reset element 114. The pixel selection control signal line SEL is a signal line that transmits a pixel selection control signal as a signal for controlling an image signal output in the signal output element 116. As described above, the signal lines are arranged for each row. In FIG. 2, these signal lines are identified by the row numbers. For example, "SEL1" denotes the pixel selection control signal line SEL arranged in the first row of the pixel array unit 10. Furthermore, a power line Vdd and a ground line are wired to the pixel 110. The power line Vdd is a power line that supplies electric power necessary in the operations of the signal generation element 115 and a reset voltage described below.

An anode of the photoelectric conversion element 111 is grounded, and a cathode of the photoelectric conversion element 111 is connected to the source of the electric charge transfer element 113. The gate of the electric charge transfer element 113 is connected to the transfer control signal line TR1, and the drain is connected to the drain of the reset element 114, the gate of the signal generation element 115, and one end of the electric charge storing element 112. The other end of the electric charge storing element 112 is grounded. The gate of the reset element 114 is connected to the reset control signal line RST1, and the source is connected to the power line Vdd. The drain of the signal generation element 115 is connected to the power line Vdd, and the source is connected to the drain of the signal output element 116. The gate of the signal output element 116 is connected to the pixel selection control signal line SEL1, and the source is connected to the signal line 11.

The photoelectric conversion element 111 generates and stores electric charges in response to emitted light. A photodiode may be employed in the photoelectric conversion element 111.

The electric charge transfer element 113 transfers the electric charge stored in the photoelectric conversion element 111 to the electric charge storing element 112. The electric charge transfer element 113 transfers the electric charge by electrically connecting the photoelectric conversion element 111 and the electric charge storing element 112. The electric charge transfer element 113 is controlled by the transfer control signal transmitted through the transfer control signal line TR1. Specifically, in a case where the ON signal is input as the transfer control signal, the electric charge transfer element 113 is electrically connected to transfer the electric charge.

The electric charge storing element 112 stores the electric charge transferred from the electric charge transfer element 113. That is, the electric charge storing element 112 stores the electric charge generated by the photoelectric conversion element 111. A floating diffusion region formed in a diffusion layer of a semiconductor substrate may be employed as the electric charge storing element 112. The electric charge storing element 112 also serves as a charge-voltage conversion unit. That is, since the electric charge storing element 112 also serves as a stray capacitance, a voltage of the electrode connected to the signal generation element 115 out of a pair of electrodes of the electric charge storing element 112 becomes a voltage that depends on the amount of electric charges stored in the electric charge storing element 112.

The reset element 114 performs a reset operation by discharging electric charges stored in the electric charge storing element 112. The reset element 114 discharges electric charges by applying the reset voltage as a voltage supplied from the power line Vdd to the electric charge storing element 112. Similarly to the electric charge transfer element 113, the reset element 114 is controlled by the reset control signal transmitted through the reset control signal line RST1.

The signal generation element 115 generates a signal that depends on the electric charges stored in the electric charge storing element 112 as an image signal. The signal generation element 115 generates the image signal by amplifying a voltage of the electric charge storing element 112 serving as the charge-voltage conversion unit.

The signal output element 116 outputs the image signal generated by the signal generation element 115 to the signal line 11. Similarly to the electric charge transfer element 113, the signal output element 116 is controlled by the pixel selection control signal transmitted through the pixel selection control signal line SEL1

Configuration of Test Signal Generator

FIG. 3 is a diagram illustrating an exemplary configuration of the test signal generator 120 according to the first embodiment of the present technology. The configuration of the test signal generator 120 is similar to that of the pixel 110 described in conjunction with FIG. 2 except that the photoelectric conversion element 111 is omitted. In addition, a signal line 22 is wired to the test signal generator 120, so that a test voltage is supplied. The electric charge transfer element 113 and the drain of the reset element 114 of FIG. 3 are commonly connected to the signal line 22.

Generation of the reset test voltage and the transfer test signal in the test signal generator 120 of FIG. 3 will be described. The reset test signal is generated in the following sequence. First, the test voltage generator 240 supplies the reset test voltage to the test signal generator 120. Then, the ON signal is input from the reset control signal line RST1, and the reset element 114 is electrically connected, so that the reset test voltage is stored in the electric charge storing element 112. A signal corresponding to the stored voltage is generated by the signal generation element 115 as the reset test signal. In this case, the reset test signal having a voltage substantially equal to the reset test voltage is generated. The reset test signal is output from the signal output element 116 to the signal line 11. The reset voltage may be employed as the reset test voltage. By commonly using the reset test voltage as the reset voltage, it is possible to simplify the configuration of the imaging device 1.

Meanwhile, the transfer test signal is generated in the following sequence. First, the test voltage generator 240 generates a transfer test voltage and supplies the transfer test voltage to the test signal generator 120 through the signal line 22. Then, the ON signal is input from the transfer control signal line TR1, and the electric charge transfer element 113 is electrically connected, so that the transfer test voltage is stored in the electric charge storing element 112. A signal corresponding to the voltage stored in the electric charge storing element 112 is generated by the signal generation element 115 as the transfer test signal. In this case, since the transfer test voltage is stored in the electric charge storing element 112, a voltage substantially equal to the transfer test voltage is generated as the transfer test signal. A voltage ranging within a dynamic range of the image signal of the pixel 110 may be employed as the transfer test voltage. As a result, it is possible to easily perform various types of processing such as analog/digital conversion of the transfer test signal.

As described above, the test voltage generator 240 changes the test voltage from the reset test voltage to the transfer test voltage while the reset test signal and the transfer test signal are generated. In this case, the test voltage generator 240 changes the test voltage before a failure detection process on the control signal line in the failure detector 280. In a case where abnormality occurs in the operations of the electric charge transfer element 113 and the reset element 114 due to a failure of the control signal line, the voltage of the electric charge storing element 112 changes depending on the test voltage. In this regard, by reflecting this change on the reset test signal and detecting it by the failure detector 280, a failure in the transfer control signal line TR and the reset control signal line RST can be detected. In this manner, the test voltage generator 240 changes the test voltage from the reset test voltage to a test voltage having a different voltage when the reset test signal is generated.

In this manner, by adding the test signal generator 120 having a configuration similar to that of the pixel 110, it is possible to detect a failure in the signal line 21 and reduce a change of the layout or the like of the pixel array unit 10. Note that, since the configuration of the test signal generator 130 is similar to that of the test signal generator 120, it will not be described repeatedly.

Note that the electric charge transfer element 113 is an example of a transfer test signal generator described in the claims. The reset element 114 is an example of a reset test signal generator described in the claims. In addition, the electric charge storing element 112 is an example of a capacitor described in the claims.

Configuration of Vertical Scanning Unit

FIG. 4 is a diagram illustrating an exemplary configuration of the vertical scanning unit 210 according to an embodiment of the present technology. The vertical scanning unit 210 includes an address decoder 211 and a pixel driving unit 212.

The address decoder 211 generates a signal for selecting a row of the pixel array unit 10 and outputs it to the pixel driving unit 212. The address decoder 211 is connected to the pixel driving unit 212 through a plurality of signal lines corresponding to the rows of the pixel array unit 10 to sequentially select the signal lines and output the signal, so that the row of the pixel array unit 10 is selected. For example, a shift register may be employed in the address decoder 211.

The pixel driving unit 212 generates a control signal for the pixel 110 and outputs the control signal through the signal line 21. The pixel driving unit 212 generates the transfer control signal, the reset control signal, and the pixel selection control signal described above as the control signals and outputs the control signals to the transfer control signal line TR, the reset control signal line RST, and the pixel selection control signal line SEL, respectively, as illustrated in FIG. 4. The pixel driving unit 212 outputs the control signal generated to the signal line 21 wired to the pixel 110 corresponding to the row selected by the address decoder 211 out of the signal lines.

Note that the configuration of the vertical scanning unit 220 is similar to that of the vertical scanning unit 210, and it will not be described repeatedly.

Configuration of A/D Conversion Unit

FIG. 5 is a diagram illustrating an exemplary configuration of the A/D conversion unit 230 according to the first embodiment of the present technology. This A/D conversion unit 230 includes constant current power sources 232 and A/D conversion elements 231. The constant current power sources 232 and the A/D conversion elements 231 are arranged for each signal line 11.

The constant current power sources 232 are connected between the signal line 11 and the ground to serve as a load of the signal output element 116 in the pixels 110 and the test signal generators 120 and 130.

The A/D conversion elements 231 perform analog/digital conversion for the image signal and the test signal. The A/D conversion elements 231 are controlled by the control unit 260 such that the reference signal generated from the reference signal generator 250 is compared with an image signal or the like, and a digital signal generated on the basis of the comparison result is output as a result of the analog/digital conversion. Out of the A/D conversion elements 231 of FIG. 5, the A/D conversion element 231 connected to the pixel 110 generates a digital image signal. In FIG. 5, the A/D conversion elements 231 other than those arranged in both ends generate the digital image signals and output the digital image signals to the signal processing unit 270 through the signal line 26. Meanwhile, the A/D conversion element 231 connected to the test signal generator 120 or the like generates a digital test signal. In FIG. 5, the A/D conversion elements 231 arranged in both ends generate digital test signals and output the digital test signals to the failure detector 280 through the signal lines 27 and 28.

Configuration of A/D Conversion Element

FIG. 6 is a diagram illustrating an exemplary configuration of the A/D conversion element 231 according to an embodiment of the present technology. The A/D conversion element 231 includes capacitors 301 and 302, a comparison element 303, and a count element 304.

The capacitors 301 and 302 are coupling capacitors. The capacitor 301 is connected between the signal line 11 and an input of the comparison element 303 to transmit the image signal or the test signal to the comparison element 303. In addition, the capacitor 302 is connected between the signal line 23 and an input of the comparison element 303 to transmit the reference signal to the comparison element 303.

The comparison element 303 compares the image signal or the test signal with the reference signal. The comparison element 303 outputs a result of the comparison to the count element 304. Specifically, in a case where a voltage of the image signal or the like is lower than a voltage of the reference signal, a value "0" may be output. In a case where the voltage of the image signal or the like is higher than the voltage of the reference signal, a value "1" may be output as the result of the comparison.

The count element 304 counts time from the start of the analog/digital conversion of the A/D conversion element 231 to the output of the comparison result from the comparison element 303. This time counting is performed by counting a clock signal (not shown). Along with the start of the analog/digital conversion of the A/D conversion element 231, the reference signal having a voltage decreasing in a ramp shape starts to be output from the reference signal generator 250 and is compared with the image signal or the like by the comparison element 303. Then, when the output value of the comparison element 303 changes from "0" to "1," the count element 304 stops the counting. The voltage of the image signal or the like in this case is substantially equal to the voltage of the reference signal. Since the voltage of the reference signal matches the count value of the count element 304 one to one, this count value becomes a digital value corresponding to the voltage of the image signal or the like. This digital value is output as a result of the analog/digital conversion of the image signal or the like. In this manner, the A/D conversion element 231 performs the analog/digital conversion. The count element 304 is controlled by the control signal from the control unit 260 to perform the analog/digital conversion described above.

When the A/D conversion element 231 performs analog/digital conversion for the image signal, correlated double sampling (CDS) is performed to remove noise unique in the pixel 110. This CDS may be performed in the following manner. First, analog/digital conversion is performed for a reset operation image signal which is a signal output to the signal line 11 during a reset operation of the pixel 110, and a result of the comparison is stored in the count element 304. Then, the count value stored in the count element 304 is inverted on a bit-by-bit basis. Then, analog/digital conversion is performed for the image signal generated when an electric charge generated by the photoelectric conversion element 111 is transmitted to the electric charge storing element 112. In this case, the count element 304 starts the counting by using the inverted count value as an initial value and subtracts the reset operation image signal from the image signal. As a result, the CDS is executed. The digital image signal subjected to the CDS is output to the signal processing unit 270.

In addition, when the A/D conversion element 231 performs analog/digital conversion for the test signal, analog/digital conversion for the reset test signal output to the signal line 11 after the reset operation, and analog/digital conversion for the transfer test signal output to the signal line 11 after transmission of the electric charge are sequentially performed, so that a digital reset test signal and a digital transfer test signal are output to the failure detector 280.

In this manner, the A/D conversion element 231 performs analog/digital conversion for the signal output from the connected pixel 110 and the test signal generator 120 or the like and outputs the converted digital signal.

Configuration of Failure Detector

FIG. 7 is a diagram illustrating an exemplary configuration of the failure detector 280 according to the first embodiment of the present technology. The failure detector 280 includes a test voltage storing element 281, comparison elements #1 (282) and #2 (283), and a failure information generator 284.

The test voltage storing element 281 stores the test voltage generated by the test voltage generator 240. The test voltage storing element 281 stores digital values corresponding to a transmission control test voltage and a reset control test voltage and outputs them to the comparison elements #1(282) and #2 (283).

The comparison elements #1 (282) and #2 (283) compare the test signal and the test voltage. The comparison element #1 (282) is connected to the signal line 27. The test signal generated by the test signal generator 120 is subjected to analog/digital conversion, and the digital test signal is input to the comparison element #1 (282). Meanwhile, the comparison element #2 (283) is connected to the signal line 28. The test signal generated by the test signal generator 130 is subjected to analog/digital conversion, and the digital test signal is input to the comparison element #2 (283).

As described in conjunction with FIG. 3, the transfer test signal and the reset test signal having voltages substantially equal to the transfer test voltage and the reset test voltage, respectively, are output from the test signal generator 120 or the like during a normal operation. However, in a case where a failure such as disconnection occurs in the transfer control signal line TR and the reset control signal line RST, the transfer test signal and the reset test signal having values different from the transfer test voltage and the reset test voltage, respectively, are output from the test signal generator 120 or the like. The comparison element #1 (282) or the like in FIG. 7 compares the transfer test signal and the reset test signal with the transfer test voltage and the reset test voltage, respectively, and outputs a comparison result to the failure information generator 284.

The failure information generator 284 generates and outputs failure information as information on a failure in the transfer control signal line TR or the like on the basis of the comparison result output from the comparison elements #1 (282) and #2 (283). The failure information generator 284 detects a failure in the transfer control signal line TR, for example, in a case where the transfer test signal is different from the transfer test voltage. In this case, the failure information generator 284 may output information indicating that a failure occurs in the transfer control signal line TR as the failure information. In addition, information on the row where the failure occurs may be generated by providing a row counter or the like that stores a target output row of the control signal in the vertical scanning unit #1 (210) or the like.

Configurations of Pixel Array Unit and Driving Units

FIG. 8 is a diagram illustrating exemplary configurations of the pixel array unit 10 and the driving unit 20 according to an embodiment of the present technology. FIG. 8 shows wiring states of the signal lines 21 and 11 in the pixel array unit 10 and the driving unit 20. The wiring state of the signal line 21 will be described by exemplifying the pixel selection control signal line SEL.

The pixel selection control signal line SEL includes wire lines 170, 291, and 292 and connection terminals 160. The wire line 170 is formed in the pixel array unit 10 and is wired commonly between the gates of the signal output elements 116 of the pixels 110 and the test signal generator 120 or the like. The wire lines 291 and 292 are formed in the driving unit 20 and are connected to the vertical scanning units #1 (210) and #2 (220), respectively. The connection terminals 160 are used to connect the wire line 170 and the wire lines 291 and 292 to each other. The connection terminals 160 are used to transmit signals between different semiconductor chips. Similarly to the signal line 21, signal transmission on the signal line 11 is also performed through the connection terminals 160. As the connection terminal 160, for example, a via hole penetrating through the semiconductor chip or a pad formed on a surface of the semiconductor chip and connected by performing a thermal press bonding process may be employed. The transfer control signal line TR and the reset control signal line RST may have configurations similar to that of the pixel selection control signal line SEL described above.

In FIG. 8, even in a case where a failure such as disconnection occurs between the test signal generators 120 and 130, that is, in an area where a plurality of pixels 110 are arranged on the wire line 170, the control signals output from each of the vertical scanning units #1 (210) and #2 (220) are transmitted. For this reason, the transmission of the control signal is not interrupted, and the image signal is generated normally. As illustrated in FIG. 8, the signal line 21 is connected commonly to the vertical scanning unit #1 (210), the test signal generator 120, the pixel 110, the test signal generator 130, and the vertical scanning unit #2 (220) in this order. As a result, in a case where the wire line 170 is disconnected between the test signal generators 120 and 130, a failure in the test signal generator 120 or the like is not detected, and it is possible to avoid unnecessary failure information from being output.

In contrast, in a case where a failure such as poor connection occurs in a pair of connection terminals 160 arranged in the signal line 21, the control signals output from the vertical scanning units #1 (210) and #2 (220) are not transmitted to the wire line 170. In this case, it is possible to detect a failure in the test signal generator 120 or the like. In addition, in a case where one of the connection terminals 160 is failed, the control signal is transmitted through the other connection terminal 160. Therefore, it is possible to generate an image signal from the pixel 110, and a failure in the test signal generator 120 or the like is not detected. However, in order to improve reliability of the imaging device 1, it is necessary to detect a failure state in a single connection terminal 160. In this case, a failure may be detected by using a transfer time of the control signal. Since it takes time to transfer the control signal output from the vertical scanning unit #1 (210) or the like, a settling time of the test signal output from the test signal generator 120 or the like arranged in the vicinity of a failed connection terminal 160 is longer than the settling time of the test signal output from the test signal generator 120 or the like arranged in the vicinity of an unfailed connection terminal 160. It is possible to detect a failure state of a single connection terminal 160 by detecting a failure using the failure detector 280 within a time period shorter than this settling time.

Configuration of Connection Terminal

FIG. 9 is a diagram illustrating an exemplary configuration of the connection terminal 160 according to an embodiment of the present technology. FIG. 9 is a schematic diagram illustrating a cross-sectional configuration of the imaging device 1 and shows a configuration of the signal line 21 in a coupling element between the pixel array unit 10 and the driving unit 20.

"a" of FIG. 9 illustrates an example in which the connection terminal 160 includes a pair of via holes. The pixel array unit 10 includes insulation layers 191 and 195 and a well region 192. The well region 192 is formed of a P-type semiconductor, and N-type semiconductor regions 193 and 194 are formed in the drain and source regions, respectively, of the signal output element 116. The insulation layer 195 includes an electrode 196 serving as the gate of the signal output element 116, via-hole plugs 171 and 173, and a wire line 172. The via-hole plugs 171 and 173 and the wire line 172 are included in the wire line 170.

The connection terminal 160 includes pads 161 and 163 formed in the insulation layers 195 and 191, respectively, of the pixel array unit 10, via holes 162 and 164, and a pad 165 formed in the driving unit 20. The pad 161 is connected to the via-hole plug 173. The pads 161 and 163 are connected to each other through the via hole 162, and the pads 163 and 165 are connected to each other through the via hole 164.

The driving unit 20 of FIG. 9 is illustrated by simplifying a configuration of the vicinity of the signal line 21. The wire line 291 of FIG. 9 connects the pad 165 and the vertical scanning unit 210 to each other. In this manner, the pads 161, 163, and 165 are connected to each other through the via holes 162 and 164 to transmit the control signal.

"b" of FIG. 9 illustrates an example in which the connection terminal 160 includes a single via hole. In "b" of FIG. 9, the via hole 164 connects the pads 161 and 165 to each other. Compared to the configuration of "a" of FIG. 9, it is possible to shorten a manufacturing process and reduce an area occupied by the connection terminal 160.

FIG. 10 is a diagram illustrating another exemplary configuration of the connection terminal 160 according to an embodiment of the present technology. The connection terminal 160 of FIG. 10 includes pads 166 and 167. The pad 166 is formed on a chip surface of the pixel array unit 10, and the pad 167 is formed on a chip surface of the driving unit 20. When the pixel array unit 10 and the driving unit 20 are bonded to each other through a thermal press bonding process, the pads 166 and 167 are electrically bonded to each other to allow signal transmission. Unlike the via hole of FIG. 9, it is not necessary to form a through-hole in the semiconductor chip. Therefore, it is possible to arrange the connection terminal 160 in an arbitrary position of the chip.

In this manner, using the connection terminal 160 including the via holes 162 and 164 and the pads 166 and 167 bonded through a thermal press bonding process, it is possible to perform signal transmission between different chips. However, since such connection terminals 160 are formed between different chips, a stress is concentrated, and a failure such as poor connection may easily occur. In this regard, a failure is detected by arranging the test signal generator 120 or the like in the pixel array unit 10. Note that detection of a failure using the test signal generator 120 or the like is also effective in detection of an initial defect of the imaging device 1.

Generation of Image Signal and Test Signal

FIG. 11 is a diagram illustrating an example of generation of the image signal and the test signal according to an embodiment of the present technology. In FIG. 11, "SEL1," "RST1," and "TR1" denote control signals for the pixel selection control signal line SEL, the reset control signal line RST, and the transfer control signal line TR, respectively, arranged in the first row of the pixel array unit 10. The elements indicated by the value "1" in these binary waveforms correspond to the input of the ON signal. In addition, "SEL2," "RST2," and "TR2" denote control signals of the signal lines arranged in the second row of the pixel array unit 10. In addition, "Vtest" refers to a test voltage supplied from the test voltage generator 240. In the waveform of this test voltage, a high voltage element corresponds to a period of supplying the reset test voltage, and a low voltage element corresponds to a period of supplying the transfer test voltage. The waveforms of the "ELECTRIC CHARGE STORING ELEMENT (PIXEL)" and the "IMAGE SIGNAL" indicate a voltage of the electric charge storing element 112 and the image signal of the pixel 110 arranged in the first row, respectively. The waveforms of the "ELECTRIC CHARGE STORING ELEMENT (TEST SIGNAL GENERATOR)" and the "TEST SIGNAL" indicate a voltage of the electric charge storing element 112 and a test signal of the test signal generator 120 arranged in the first row, respectively. In addition, in FIG. 11, it is assumed that a reset test voltage having a value equal to the voltage supplied from the power line Vdd (hereinafter, referred to as "Vdd") to the pixel 110 is supplied to the test signal generator 120.

At the timing T0, all of the control signal lines are set to "0," and the test voltage generator 240 supplies the voltage Vdd as the reset test voltage. This state corresponds to an initial state.

At the timing T1 to T5, the ON signal is input from the reset control signal line RST1 and the transfer control signal line TR1, so that the electric charge storing element 112 and the photoelectric conversion element 111 of the pixel 110 are reset. As a result, exposure of the pixels 110 arranged in the first row starts. This reset operation increases the voltage of the electric charge storing element 112 of the pixel 110 to Vdd. The electric charge storing element 112 of the test signal generator 120 is also reset, and its voltage increases to Vdd (T1). Then, the input of the ON signal from the reset control signal line RST1 and the transfer control signal line TR1 stops (T2 to T5). The voltages of the electric charge storing elements 112 of the pixel 110 and the test signal generator 120 are maintained at Vdd. Note that the operations of the pixels 110 and the like arranged in the second row of the pixel array unit 10 will be described below.

At the timing T5 to T7, the ON signal is input from the reset control signal line RST1, and the electric charge storing elements 112 of the pixel 110 and the test signal generator 120 are reset again (T5). In addition, the ON signal is input from the pixel selection control signal line SEL1, and an image signal corresponding to the voltage of the electric charge storing element 112 of the pixel 110 is output. Similarly, a test signal corresponding to the voltage of the electric charge storing element 112 of the test signal generator 120 is output. This test signal corresponds to the reset test signal. The ON signal is continuously input from this pixel selection control signal line SEL1 until the timing T11. Then, the input of the ON signal from the reset control signal line RST1 stops (T6). As a result, the reset operation image signal corresponding to the voltage of the electric charge storing element 112 of the pixel 110 is output. At the same time, a reset test voltage corresponding to the voltage of the electric charge storing element 112 of the test signal generator 120 is generated and output. Meanwhile, the test voltage generator 240 changes the supplied test voltage from the reset test voltage to the transfer test voltage (T6 to T7).

At the timing T7 to T8, the reset operation image signal output from the pixel 110 is subjected to analog/digital conversion, and the conversion result is stored in the count element 304. At the same time, the reset test voltage output from the test signal generator 120 is subjected to analog/digital conversion and is output to the failure detector 280.

At the timing T8 to T9, the ON signal is input from the transfer control signal line TR1, and the electric charge generated from the photoelectric conversion element 111 is transferred to the electric charge storing element 112. An image signal corresponding to the transferred electric charges is output. Meanwhile, in the test signal generator 120, the transfer test voltage is applied to the electric charge storing element 112 to generate and output the transfer test signal.

At the timing T9 to T10, the image signal output from the pixel 110 is subjected to analog/digital conversion to output the digital image signal to the signal processing unit 270. Meanwhile, the transfer test signal output from the test signal generator 120 is subjected to analog/digital conversion and is output to the failure detector 280.

At the timing T10 to T11, the test voltage generator 240 changes the test voltage from the transfer test voltage to the reset test voltage. Then, the input operation of the ON signal to the pixel selection control signal line SEL1 stops (T11).

Note that, similarly to the timing T1 to T11, at the timing T3 to T18, the control signal is input to the pixel selection control signal line SEL2, the reset control signal line RST2, and the transfer control signal line TR2 to generate the image signal and the test signal for the second row. A driving method in which exposure and generation of the image signal are performed sequentially for each row in this manner is called a rolling shutter method. An image signal corresponding to a single screen can be generated by driving all of the rows of the pixel array unit 10 using the rolling shutter method. Note that the test signal generator 130 also generates the test signal in a similar manner to the test signal generator 120.

In this manner, when the control signal is transmitted through the pixel selection control signal line SEL, the reset control signal line RST, and the transfer control signal line TR, the reset test signal and the transfer test signal are generated as illustrated in FIG. 11. However, in a case where the control signal is not appropriately transmitted due to a failure in the signal line, a test signal different from that illustrated in FIG. 11 is generated.

Test Signal when Transfer Control Signal Line is Failed

FIG. 12 is a diagram illustrating an example of the test signal when the transfer control signal line is failed according to an embodiment of the present technology. "a" of FIG. 12 illustrates a case where the value of the transfer control signal is fixed to "1" due to a failure in the transfer control signal line TR1, that is, a waveform exhibited when the transfer control signal line TR1 suffers from a stuck-at fault to "1." This corresponds to a case where a short-circuit is generated between the transfer control signal line TR1 and the power line Vdd. In addition, "b" of FIG. 12 illustrates a case where the value of the transfer control signal is fixed to "0" due to a failure in the transfer control signal line TR1, that is, a waveform exhibited when the transfer control signal line TR1 suffers from a stuck-at fault to "0." This corresponds to a case where the transfer control signal line TR1 is disconnected. In FIG. 12, the waveforms indicated by the dotted line indicate a case where a failure does not occur. These waveforms correspond to those described in conjunction with FIG. 11.

In "a" of FIG. 12, the ON signal is input from the transfer control signal line TR1 at all times. For this reason, at the timing T6 to T8, the reset test signal has a voltage substantially equal to the transfer test voltage supplied from the test voltage generator 240. That is, the reset test signal has a voltage different the reset test voltage. In this case, the reset test signal and the reset test voltage are compared using the comparison elements #1 (282) and #2 (283) described in conjunction with FIG. 7 to detect a failure in the transfer control signal line TR1.

In "b" of FIG. 12, since the ON signal is not input from the transfer control signal line TR1, the transfer test signal has a voltage substantially equal to the reset test voltage at the timing T8 to T10. That is, the transfer test signal has a voltage different from the transfer test voltage. In this case, the transfer test signal and the transfer test voltage are compared using the comparison elements #1 (282) and #2 (283) to detect a failure in the transfer control signal line TR1.

Test Signal when Reset Control Signal Line is Failed

FIG. 13 is a diagram illustrating an example of the test signal when the reset control signal line is failed according to an embodiment of the present technology. "a" of FIG. 13 illustrates a waveform exhibited when the reset control signal line RST suffers from a stuck-at fault to "1." "b" of FIG. 13 illustrates a waveform exhibited when the reset control signal line RST suffers from a stuck-at fault to "0."

In "a" of FIG. 13, since the ON signal is input from the reset control signal line RST1 at all times, the reset test signal has a voltage substantially equal to the transfer test voltage at the timing T6 to T8. That is, the reset test signal has a voltage different from the reset test voltage. In this case, the reset test signal and the reset test voltage are compared using the comparison elements #1 (282) and #2 (283).

In "b" of FIG. 13, since the ON signal is not input from the reset control signal line RST1, the reset test signal has a voltage substantially equal to the transfer test voltage stored in the electric charge storing element 112 when the previous control signal is input at the timing T6 to T8. That is, the reset test signal has a voltage different from the reset test voltage. In this case, the reset test signal and the reset test voltage are compared using the comparison elements #1 (282) and #2 (283). Note that, in "b" of FIG. 13, it is assumed that exposure for the first row starts when the test voltage generator 240 supplies the transfer test voltage at the timing T1 to T2.

Test Signal when Pixel Selection Control Signal Line is Failed

FIG. 14 is a diagram illustrating an example of the test signal when the pixel selection control signal line is failed according to an embodiment of the present technology. FIG. 14 illustrates a waveform exhibited when the pixel selection control signal line SEL1 is not failed, and the pixel selection control signal line SEL2 suffers from a stuck-at fault to "1." In addition, the waveforms of the "ELECTRIC CHARGE STORING ELEMENT #1" and the "ELECTRIC CHARGE STORING ELEMENTS #2" indicate voltages of the electric charge storing elements 112 of the test signal generators 120 arranged in the first and second rows, respectively. Since the ON signal is input from the pixel selection control signal line SEL2 at all times, a signal corresponding to the voltage of the electric charge storing element 112 of the test signal generator 120 arranged in the second row is output to the signal line 11 at the timing T3 to T15. As a result, at the timing T8 to T11, the signal output element 116 of the test signal generator 120 arranged in the first row has an OFF state, and the transfer test signal has a voltage substantially equal to the reset test voltage. That is, the transfer test signal has a voltage different from the transfer test voltage. In this case, the transfer test signal and the transfer test voltage are compared using the comparison elements #1 (282) and #2 (283).

Meanwhile, at the timing T12 to T18, the reset test signal and the transfer test signal are normally output from the test signal generator 120 arranged in the second row.

In this manner, a stuck-at fault to "1" in the pixel selection control signal line SEL can be detected by outputting the normal transfer test signal in the failed row and outputting the transfer test signal having a voltage substantially equal to the reset test voltage in other rows.

FIG. 15 is a diagram illustrating another example of the test signal when the pixel selection control signal line is failed according to an embodiment of the present technology. FIG. 15 illustrates a waveform exhibited when a stuck-at fault to "0" occurs in the pixel selection control signal line SEL1. Since the ON signal is not input from the pixel selection control signal line SEL1, the reset test signal and the transfer test signal having a substantially equal voltage are output. That is, the reset test signal has a voltage different from the reset test voltage. In this case, the reset test signal and the reset test voltage are compared using the comparison elements #1 (282) and #2 (283).

As described above in conjunction with FIGS. 12 to 15, the reset test signal and the transfer test signal are compared with the reset test voltage and the transfer test voltage, respectively, using the comparison elements #1 (282) and #2 (283). Therefore, it is possible to detect a failure in the transfer control signal line TR, the reset control signal line RST, and the pixel selection control signal line SEL.

In this manner, according to the first embodiment of the present technology, the transfer test signal and the reset test signal are generated from the transfer control signal and the reset control signal, respectively, using the test signal generator applied with the test voltage. It is possible to detect a failure in the transfer control signal line and the reset control signal line by comparing the transfer test signal and the reset test signal with the normal transfer test signal and the normal reset test signal.

2. Second Embodiment

In the first embodiment described above, the control signal is supplied to the pixel array unit 10 from a pair of vertical scanning units #1 (210) and #2 (220). In contrast, the control signal may be supplied from a single vertical scanning unit. The second embodiment of the present technology is different from the first embodiment described above in that the number of vertical scanning units is reduced by one.

Configuration of Imaging Device

FIG. 16 is a diagram illustrating an exemplary configuration of the imaging device 1 according to the second embodiment of the present technology. In FIG. 16, the imaging device 1 is different from the imaging device 1 described in conjunction with FIG. 1 as described below. The imaging device 1 of FIG. 16 does not necessarily have the vertical scanning unit #2 (220). In addition, in the imaging device 1 of FIG. 16, the pixel array unit 10, the vertical scanning unit 210, the A/D conversion unit 230, the test voltage generator 240, the reference signal generator 250, the control unit 260, the signal processing unit 270, and the failure detector 280 are formed in the same semiconductor chip.

The test signal generator 120 is arranged for each row of the pixel array unit 10 of FIG. 16. In addition, the signal line 21 is commonly connected to the vertical scanning unit 210, the pixel 110, and the test signal generator 120 in this order. That is, the test signal generator 120 is connected to a terminated end portion of the signal line 21. As a result, it is possible to improve failure detection accuracy of the signal line 21.

The A/D conversion unit 230 of FIG. 16 performs analog/digital conversion for the test signal transmitted through a single signal line 11 and outputs the digital test signal to the failure detector 280 through the signal line 27. The failure detector 280 of FIG. 16 detects a failure on the basis of the digital test signal transmitted through the signal line 27. Since the imaging device 1 of FIG. 16 includes a single semiconductor chip, it is not necessary to provide a connection terminal 160 of the signal line 21. For this reason, compared to the imaging device 1 of FIG. 1, a failure rate of the signal line 21 is reduced. In this regard, it is possible to omit one of a pair of vertical scanning units. As a result, it is possible to simplify the configuration of the imaging device 1.

Other configurations of the imaging device 1 are similar to those of the imaging device 1 of the first embodiment of the present technology, and they will not be described repeatedly.

In this manner, according to the first embodiment of the present technology, it is possible to simplify the configuration of the imaging device 1 by reducing one of the vertical scanning units by forming the imaging devices 1 in the same semiconductor chip.

3. Third Embodiment

In the first embodiment described above, the image signals are generated sequentially from the rows of the pixel array unit 10, and the analog/digital conversion for the image signal is performed for each row. In contrast, the pixels 110 of the pixel array unit 10 may be divided into a plurality of areas, and generation of the image signal and the analog/digital conversion may be performed for each divided area. The third embodiment of the present technology is different from the first embodiment described above in that generation of the image signal or the like is performed for each area.

Configuration of Imaging Device

FIG. 17 is a diagram illustrating an exemplary configuration of the imaging device 1 according to the third embodiment of the present technology. The imaging device 1 of FIG. 17 is different from the imaging device 1 of FIG. 1 in that the imaging device 1 has a plurality of A/D conversion units 230.

In the pixel array unit 10 of FIG. 17, pixel units 410 instead of the pixels 110 are arranged in a matrix shape. In addition, a failure detection unit 420 is arranged for each row instead of the test signal generators 120 and 130. In addition, the signal lines 21 and 22 are wired to the pixel units 410 and the failure detection units 420 in a similar manner to the pixel array units 10 described in conjunction with FIG. 1.

In the imaging device 1 of FIG. 17, the A/D conversion units 230 are arranged to mate with the pixel units 410 and the failure detection units 420 of the pixel array unit 10 to perform analog/digital conversion for each image signal or the like and output each of the converted image signals or the like to the signal processing unit 270 or the failure detector 280. The pixel units 410, the failure detection units 420, and the A/D conversion units 230 mating with the pixel units 410 and the failure detection units 420 are wired individually through the signal line 11.

Configuration of Pixel Unit

FIG. 18 is a diagram illustrating an exemplary configuration of the pixel unit 410 according to the third embodiment of the present technology. The pixel unit 410 includes pixels 110 arranged in a matrix shape. In FIG. 18, it is assumed that 10?10 pixels 110 are arranged. The pixel selection control signal line SEL and the reset control signal line RST are arranged for each row and are wired commonly to the pixels 110 arranged in a single row. In FIG. 18, the pixel selection control signal line SEL and the reset control signal line RST are identified by assigning the row number of the pixel unit 410 and the row number of the pixel 110. For example, the pixel selection control signal line SEL1_2 denotes the pixel selection control signal line SEL wired to the pixel 110 of the second row in the pixel unit 410 of the first row.

Meanwhile, the transfer control signal line TR is arranged for each pixel 110. In FIG. 18, the transfer control signal line TR is identified by assigning the row number of the pixel unit 410 and the row number of the pixel 110. For example, the transfer control signal line TR1_2 denotes the transfer control signal line TR wired to the pixel 110 arranged in the first row and the second column in the pixel unit 410 of the first row. Note that the pixel selection control signal line SEL, the reset control signal line RST, and the transfer control signal line TR are wired commonly to the pixel units 410 arranged in the same row.

In addition, in the pixel unit 410, the signal lines 11 are arranged for each column and are wired commonly to the pixels 110 arranged in the column.

Configuration of Failure Detection Unit

FIG. 19 is a diagram illustrating an exemplary configuration of the failure detection unit 420 according to the third embodiment of the present technology. The failure detection unit 420 is formed by arranging the test signal generators 120 in a matrix shape. In addition, The pixel selection control signal line SEL, the reset control signal line RST, and the transfer control signal line TR described in conjunction with FIG. 18 are arranged in the failure detection unit 420 in the similar manner, and wired to each test signal generator 120. In addition, the signal line 22 is wired commonly to each test signal generator 120 to supply the test voltage.

Configuration of A/D Conversion Unit

FIG. 20 is a diagram illustrating an exemplary configuration of the A/D conversion unit 230 according to the third embodiment of the present technology. The A/D conversion unit 230 of FIG. 20 is different from the A/D conversion unit 230 described in conjunction with FIG. 5 in that the A/D conversion unit 230 is provided with a selector 233 and a single A/D conversion element 231.

The selector 233 is used to select the signal line 11 wired between the pixel units 410 or the failure detection units 420. The selector 233 outputs the image signal or the like transmitted through the selected signal line 11 to the A/D conversion element 231. In addition, the selector 233 sequentially selects the signal lines 11 arranged in each column of the pixel units 410 or the like. As the row of the pixel 110 or the like is selected using the pixel selection control signal line SEL, and the column of the pixel 110 or the like is selected using the selector 233 as described in conjunction with FIG. 18, a single pixel 110 of the pixel unit 410 or the like is selected, so that an image signal is transmitted to the A/D conversion element 231.

Generation of the image signal in the pixel unit 410 is performed through a rolling shutter type processing in the arranged pixels 110. Specifically, a series of processing at the timing T1 to T11 in FIG. 11 is sequentially performed for the pixel 110 arranged in the first row and the first column to the pixel 110 arranged in the tenth row and the tenth column in FIG. 18. In addition, a series of processing for the pixel 110 arranged in the first row and the first column to the pixel 110 arranged in the tenth row and the tenth column is simultaneously performed for all of the pixel units 410 arranged in the pixel array unit 10.

In the imaging device 1 according to the first embodiment of the present technology, the rolling shutter type processing on a row-by-row basis is executed for all of the pixels 110 arranged in the pixel array unit 10. In this case, since an exposure time is different between the first row and the last row, an image obtained by photographing a moving object has a distortion. A similar distortion is also generated in the imaging device 1 of the third embodiment of the present technology. However, since the rolling shutter type processing on a pixel-by-pixel basis is executed for each pixel unit 410, the difference of the exposure time is relatively reduced. For this reason, it is possible to reduce an image distortion.

In addition, in the imaging device 1 according to the third embodiment of the present technology, the transfer control signal line TR or the like is wired to the vertical scanning unit #1 (210), the test signal generator 120, the pixel 110, the test signal generator 120, and the vertical scanning unit #2 (220) in this order to detect a failure.

Other configurations of the imaging device 1 are similar to those of the imaging device 1 of the first embodiment of the present technology, and they will not be described repeatedly.

In this manner, according to the third embodiment of the present technology, it is possible to improve image quality of the image signal by generating the image signal for each area of the pixel array unit 10.

4. Fourth Embodiment

In the first embodiment described above, the analog/digital conversion is performed for the test signal output from the test signal generator 120 or the like. In contrast, a failure may be detected by directly using the test signal output from the test signal generator 120 or the like. The fourth embodiment of the present technology is different from the first embodiment described above in that the analog/digital conversion of the test signal is omitted.

Configuration of Imaging Device

FIG. 21 is a diagram illustrating an exemplary configuration of the imaging device 1 according to the fourth embodiment of the present technology. The imaging device 1 of FIG. 21 is different from the imaging device 1 described in conjunction with FIG. 1 in that it is not necessary to provide the A/D conversion elements 231 corresponding to the test signals output from the test signal generators 120 and 130, and each test signal generated from each test signal generator 120 is transmitted to the failure detector 280.

Configuration of Failure Detector

FIG. 22 is a diagram illustrating an exemplary configuration of the failure detector 280 according to the fourth embodiment of the present technology. The failure detector 280 of FIG. 22 is different from the failure detector 280 described in conjunction with FIG. 7 in that a signal shaping element 285 and an encoder 286 are provided instead of the test voltage storing element 281 and the comparison elements #1 (282) and #2 (283). In addition, the failure detector 280 of FIG. 22 has a failure information generator 287 instead of the failure information generator 284.

The signal shaping element 285 shapes each test signal output from the test signal generators 120 and 130. The signal shaping element 285 shapes the test signal into a digital test signal having an H-level or an L-level by comparing the test signal with a predetermined threshold value. A comparator arranged in each signal line 12 may be used in the signal shaping element 285.

The encoder 286 encodes the digital test signal shaped by the signal shaping element 285. The encoder 286 encodes the test signal for each signal line 12 that transmits the test signal through the signal shaping element 285. Specifically, when a test signal is input, a row number of the test signal generator 120 or the like connected to the signal line 12 that transmits the test signal is generated and output. For example, when a transfer test signal having an L-level is input at the timing T7 to T8 in "a" of FIG. 12, the encoder 286 detects this L-level signal and outputs the row number corresponding to the signal line 12 that transmits the transfer test signal.

The failure information generator 287 generates failure information from the row number output from the encoder 286 and outputs the failure information.

Other configurations of the imaging device 1 are similar to those of the imaging device 1 of the first embodiment of the present technology, and they will not be described repeatedly.

In this manner, according to the fourth embodiment of the present technology, it is possible to omit the analog/digital conversion for the test signal by detecting a failure by encoding the test signal output from the test signal generator 120 or the like. As a result, it is possible to simplify the configuration of the imaging device 1.

5. Fifth Embodiment

In the first embodiment described above, a failure in the control signal line is detected, and the failure information is output. In contrast, correction may be performed for the image signal of the failed row. The fourth embodiment of the present technology is different from the first embodiment described above in that correction is performed for the image signal on the basis of the failure information.

Configuration of Imaging Device

FIG. 23 is a diagram illustrating an exemplary configuration of the imaging device 1 according to the fifth embodiment of the present technology. The imaging device 1 of FIG. 23 is different from the imaging device 1 described in conjunction with FIG. 1 in that a correction unit 290 is further provided.

The correction unit 290 is used to correct an image signal generated by a pixel 110 arranged in a row where a failure of the control signal occurs. The correction unit 290 specifies the failed row on the basis of the failure information output from the failure detector 280 and performs correction of the image signal. The correction of the image signal may be performed by interpolation of the image signal. The interpolation may be performed by creating a mean value of the image signals for the rows immediately preceding and following the failed row, for example. The correction unit 290 stores the image signals of the rows immediately preceding and following the failed row in a line memory and creates a mean value of the stored image signals, so that the mean value is output as an image signal of the failed row. As a result, it is possible to reduce degradation of image quality in the image signal.

Other configurations of the imaging device 1 are similar to those of the imaging device 1 of the first embodiment of the present technology, and they will not be described repeatedly.

In this manner, according to the fifth embodiment of the present technology, it is possible to reduce degradation of image quality of the pixel signal by performing correction of the image signal for the row where a failure of the control signal occurs.

6. Sixth Embodiment

In the first embodiment described above, the same test voltage is applied to the test signal generators 120 or the like. In contrast, different test voltages may also be applied to each row. The sixth embodiment of the present technology is different from the first embodiment described above in that test signals having different voltages are generated in each row by applying different test voltages to each row.

Configuration of Pixel Array Unit 10

FIG. 24 is a diagram illustrating an exemplary configuration of the pixel array unit 10 according to the sixth embodiment of the present technology. The pixel array unit 10 of FIG. 24 is different from the pixel array unit 10 described in conjunction with FIG. 1 in that a plurality of resistors 140 are further provided.

The resistor 140 is used to divide the test voltage output from the test voltage generator 240. The resistor 140 is arranged between the signal line 22 of the pixel array unit 10 and the ground in each row to divide the test voltage to each row. The divided test voltage is applied to the test signal generators 120 and 130 of each row. The test signal generator 120 or the like generates and outputs a test signal having a voltage corresponding to the applied test signal. Note that, in the pixel array unit 10 of FIG. 24, the resistor 140 is also arranged between the test signal generators 120 and 130. As a result, it is possible to apply different test voltages to the test signal generators 120 and 130.

Configuration of Failure Detector

FIG. 25 is a diagram illustrating an exemplary configuration of the failure detector 280 according to the sixth embodiment of the present technology. The failure detector 280 of FIG. 25 is different from the failure detector 280 described in conjunction with FIG. 7 in that a test signal converter 288 is further provided. In addition, the failure detector 280 of FIG. 25 is provided with a failure information generator 289 instead of the failure information generator 284.

The test signal converter 288 converts the test signal output from the test signal generator 120 or the like into information on the row. The test signal converter 288 has a table where the test voltages divided by the pixel array unit 10 are stored, so that a row in which the test signal generator 120 or the like that generates the test signal is arranged is specified by comparing the stored test voltage and the input test voltage. The test signal converter 288 outputs an identification number of the specified row to the failure information generator 289 as the information on the row. As a result, it is possible to easily specify the failed row.

The failure information generator 289 specifies the failed row on the basis of the information on the row output from the test signal converter 288 and generates failure information.

Other configurations of the imaging device 1 are similar to those of the imaging device 1 of the first embodiment of the present technology, and they will not be described repeatedly.

In this manner, according to the sixth embodiment of the present technology, the failed row is specified by generating the test signals having different voltages for each row by supplying different test voltages for each row to the test signal generator 120 or the like. As a result, it is possible to simplify the configuration of the imaging device 1.

7. Seventh Embodiment

In the first embodiment described above, the test signal is generated by the test signal generator 120 or the like. In contrast, pixels 110 that generate the test signals and the image signals may arranged, and a failure of the control signal line in the pixel may be detected. The seventh embodiment of the present technology is different from the first embodiment described above in that the test signal generator 120 or the like is omitted.

Configuration of Pixel

FIG. 26 is a diagram illustrating an exemplary configuration of the pixel 110 according to the seventh embodiment of the present technology. The pixel 110 of FIG. 26 is different from the pixel 110 described in conjunction with FIG. 2 in that a diagnosis unit 117 is additionally provided. In addition, the signal line 22 is wired to the pixel 110 of FIG. 26 to supply the test voltage. Furthermore, a diagnosis control signal line EN (Enable) that transmits the control signal to the diagnosis unit 117 is further arranged in the signal line 21. An N-channel MOS transistor may be employed in the diagnosis unit 117. Note that the test voltage generator 240 and the failure detector 280 are additionally illustrated in FIG. 26 to show a relationship with the pixel 110.

The diagnosis unit 117 has a source connected to a cathode of the photoelectric conversion element 111 and a gate connected to the diagnosis control signal line EN. A drain of the diagnosis unit 117 is connected to the signal line 22. In addition, a drain of the reset element 114 is also connected to the signal line 22.

The diagnosis unit 117 causes the pixel 110 to advance to a failure detection mode. The diagnosis unit 117 applies the test voltage to the drain of the electric charge transfer element 113 by electrically connecting the signal line 22 and the electric charge transfer element 113. The diagnosis unit 117 may be electrically connected by inputting the ON signal from the diagnosis control signal line EN. Other configurations of the pixel 110 are similar to those of the pixel 110 described in conjunction with FIG. 2, and they will not be described repeatedly. Note that the electric charge transfer element 113 and the reset element 114 of FIG. 26 correspond to an example of the test signal generator described in the claims.

The vertical scanning units #1 (210) and #2 (220) according to the seventh embodiment of the present technology generate the control signal of the diagnosis unit 117 and output the control signal through the diagnosis control signal line EN. In addition, the test voltage generator 240 according to the seventh embodiment of the present technology generates and outputs a reset voltage of the pixel 110 such as the voltage supplied from the power line Vdd and the test voltage.

A failure in the control signal line according to the seventh embodiment of the present technology may be detected in the following manner. First, the vertical scanning units #1 (210) and #2 (220) output the ON signal to the diagnosis control signal line EN. At the same time, the test voltage generator 240 generates and outputs the test voltage. Then, the control signal is input to the transfer control signal line TR, the reset control signal line RST, and the pixel selection control signal line SEL, so that the test signal can be generated. Note that the test voltage generator 240 generates and outputs the reset voltage in order to generate a normal image signal from the pixel 110.

The pixel array unit 10 according to the seventh embodiment of the present technology is not necessarily provided with the test signal generator 120 or the like. For example, all of the pixels 110 of the pixel array unit 10 may have the configuration of the pixel 110 of FIG. 26. In addition, for example, the pixels 110 arranged in both ends of each row out of the pixels 110 arranged in the pixel array unit 10 may have the configuration of the pixel 110 of FIG. 26.

Other configurations of the imaging device 1 are similar to those of the imaging device 1 of the first embodiment of the present technology, and they will not be described repeatedly.

In this manner, according to the seventh embodiment of the present technology, a failure in the control signal line is detected using the typical pixel 110. Therefore, it is possible to omit the test signal generator and simplify the configuration of the pixel array unit 10.

Application to Mobile Object

The technologies according to this disclosure (present technology) are applicable to various products. For example, the technologies according to this disclosure may be applied to a device mounted to any one of mobile objects such as an automobile vehicle, an electric vehicle, a hybrid electric vehicle, a motorcycle, a bicycle, a personal mobility, an airplane, a drone, a ship, and a robot.

FIG. 27 is a block diagram schematically illustrating an exemplary configuration of a vehicle control system as an example of a mobile object control system according to a technology of this disclosure.

The vehicle control system 12000 has a plurality of electronic control units connected via a communication network 12001. In the example of FIG. 27, the vehicle control system 12000 includes a driving system control unit 12010, a body system control unit 12020, a surrounding information detection unit 12030, an in-vehicle information detection unit 12040, and a central control unit 12050. In addition, as functional configurations of the central control unit 12050, a microcomputer 12051, a sound/image output element 12052, and an in-vehicle network I/F (interface) 12053 are illustrated.

The driving system control unit 12010 controls apparatuses relating to a vehicle driving system on the basis of various programs. For example, the driving system control unit 12010 serves as a controller for a driving force generating apparatus for generating a driving force of a vehicle such as an internal combustion engine or a driving motor, a driving force transmission mechanism for transmitting a driving force to the wheels, a steering mechanism that adjusts a steering angle, a braking apparatus for generating a braking force of the vehicle, or the like.

The body system control unit 12020 controls operations of various apparatuses provided in a chassis on the basis of various programs. For example, the body system control unit 12020 serves as a controller for a keyless entry system, a smart key system, a power window device, or various lamps such as a head lamp, a back lamp, a brake lamp, a turn signal lamp, or a fog lamp. In this case, radio waves transmitted from a portable device serving as a key or signals from various switches may be input to the body system control unit 12020. The body system control unit 12020 receives the input radio waves or signals and controls a door lock device, a power window device, a lamp, and the like of the vehicle.

The surrounding information detection unit 12030 detects external information on the vehicle where the vehicle control system 12000 is mounted. For example, the image sensing unit 12031 is connected to the surrounding information detection unit 12030. The surrounding information detection unit 12030 allows the image sensing unit 12031 to photograph an image around the vehicle and receives the photographed image. The surrounding information detection unit 12030 may perform an object detection process or a distance detection process for detecting a pedestrian, a vehicle, an obstacle, a traffic control sign, or a traffic control mark on a road surface on the basis of the received image.

The image sensing unit 12031 is an optical sensor that receives light and outputs an electric signal depending on the amount of the received light. The image sensing unit 12031 may output the electric signal as an image or distance information. In addition, the light received by the image sensing unit 12031 may be visible light or non-visible light such as infrared rays.

The in-vehicle information detection unit 12040 detects information on the interior of the vehicle. For example, a driver's condition detection unit 12041 that detects a drive's condition is connected to the in-vehicle information detection unit 12040. The driver's condition detection unit 12041 has, for example, a camera for photographing a driver, and the in-vehicle information detection unit 12040 may calculate a driver's fatigue level or a mental concentration level or determine whether or not the driver is drowsy on the basis of the detection information input from the driver's condition detection unit 12041.

The microcomputer 12051 may compute a control target value for the driving force generating apparatus, the steering mechanism, or the braking device on the basis of in-vehicle information and/or surrounding information obtained from the surrounding information detection unit 12030 or the in-vehicle information detection unit 12040 and output a control command to the driving system control unit 12010. For example, the microcomputer 12051 may perform a cooperated control for implementing advanced driver assistance system (ADAS) features such as collision avoidance or pre-crash, adaptive cruise control based on an inter-vehicle distance, intelligent speed adaptation, collision warning, or lane departure warning.

In addition, the microcomputer 12051 may perform a cooperated control for autonomous driving or the like to allow navigation without driver's input by controlling the driving force generating apparatus, the steering mechanism, the braking device, or the like on the basis of the surrounding information obtained from the surrounding information detection unit 12030 or the in-vehicle information detection unit 12040.

Furthermore, the microcomputer 12051 may output a control command to the body system control unit 12020 on the basis of the surrounding information obtained from the surrounding information detection unit 12030. For example, the microcomputer 12051 may perform a cooperated control for a glare-free capability such as switching between high-beam and low-beam by controlling head lamps depending on a position of the preceding or oncoming vehicle detected by the surrounding information detection unit 12030.

The sound/image output element 12052 transmits an output signal containing at least one of sound and image data to an output device capable of visually or audibly notifying a vehicle passenger or the outside of information. In the example of FIG. 27, the output device includes, for example, an audio speaker 12061, a display unit 12062, and an instrument panel 12063. The display unit 12062 may include, for example, at least one of an on-board display and a head-up display.

FIG. 28 is a diagram illustrating an example of the installation position of the image sensing unit 12031. In FIG. 28, the image sensing unit 12031 includes the image sensing units 12101, 12102, 12103, 12104, and 12105.

The image sensing units 12101, 12102, 12103, 12104, and 12105 are provided in, for example, a front nose, a side-view mirror, a rear bumper, a backdoor, and an upper part of an interior front glass, and the like of the vehicle 12100. The image sensing unit 12101 provided in the front nose and the image sensing unit 12105 provided in the upper part of the interior front glass usually obtain front-view images of the vehicle 12100. The image sensing units 12102 and 12103 provided in the side-view mirrors usually obtain side-view images of the vehicle 12100. The image sensing unit 12104 provided in the rear bumper or the backdoor usually obtains rearview images of the vehicle 12100. The image sensing unit 12105 provided in the upper part of the interior front glass usually detects a preceding vehicle or pedestrian, an obstacle, a signal, a traffic control sign, lanes, or the like.

Note that FIG. 28 illustrates exemplary photosensory ranges of the image sensing units 12101 to 12104. The photosensory range 12111 indicates a photosensory range of the image sensing unit 12101 provided in the front nose. The photosensory ranges 12112 and 12113 indicate photosensory ranges of the image sensing units 12102 and 12103 provided in the side-view mirrors. The photosensory range 12114 indicates a photosensory range of the image sensing unit 12104 provided in the rear bumper or the backdoor. For example, a top bird's-eye view image of the vehicle 12100 is obtained by combining the image data sensed by the image sensing units 12101 to 12104.

At least one of the image sensing units 12101 to 12104 may have a capability of obtaining distance information. For example, at least one of the image sensing units 12101 to 12104 may be a stereoscopic camera provided with a plurality of image sensors or an image sensor provided with pixels for detecting a phase difference.

For example, the microcomputer 12051 may obtain distances to each solid object within the photosensory ranges 12111 to 12114 and a temporal change of the distance (a relative velocity against the vehicle 12100) on the basis of the distance information obtained from the image sensing units 12101 to 12104 and extract, as a preceding vehicle, the closest one of the solid objects traveling at a predetermined velocity (for example, 0 km/h or higher) in substantially the same direction as that of the vehicle 12100 in the middle of a travel route of the vehicle 12100. In addition, the microcomputer 12051 may set an inter-vehicle distance to be guaranteed relative to the preceding vehicle to perform an automatic braking control (including an adaptive braking control), an automatic acceleration control (including an adaptive speed control), or the like. In this manner, the microcomputer 12051 may perform a cooperated control for autonomous navigation or the like to allow navigation without driver's input.

For example, the microcomputer 12051 may extract solid object data on the solid object on the basis of the distance information obtained from the image sensing units 12101 to 12104 by classifying the data into an auto-bicycle, a normal vehicle, a large-sized vehicle, a pedestrian, other solid objects such as a utility pole and the like and use the solid object data in automatic obstacle avoidance. For example, the microcomputer 12051 detects obstacles in the vicinity of the vehicle 12100 dividingly into an obstacle recognizable and an obstacle not recognizable by a driver of the vehicle 12100. In addition, the microcomputer 12051 may determine a collision risk indicating a danger level of collision with each obstacle and output a warning to a driver through an audio speaker 12061 or a display unit 12062 in a case where there is a possibility of the collision risk equal to or higher than a setting value. In addition, the microcomputer 12051 may perform forced deceleration or avoidance steering using the driving system control unit 12010 to provide driving assistance for collision avoidance.

At least one of the image sensing units 12101 to 12104 may be an infrared camera capable of detecting infrared rays. For example, the microcomputer 12051 may recognize a pedestrian by determining whether or not there is a pedestrian in the images obtained from the image sensing units 12101 to 12104. Such pedestrian recognition is performed by a process of extracting characteristic points from the images obtained from the image sensing units 12101 to 12104 such as an infrared camera and a process of performing a pattern matching processing for a series of characteristic points expressing a contour of the object to determine whether or not the detected object is a pedestrian. If the microcomputer 12051 determines that there is a pedestrian in the images obtained from the image sensing units 12101 to 12104 and recognizes a pedestrian, the sound/image output element 12052 controls the display unit 12062 such that a rectangular contour line for emphasizing the recognized pedestrian is overlappingly displayed. In addition, the sound/image output element 12052 may control the display unit 12062 such that an icon for indicating the pedestrian or the like is displayed in a desired position.

Hereinbefore, an exemplary vehicle control system applicable to the technology according to this disclosure has been described. The technology according to this disclosure is applicable to the image sensing unit 12031 out of the configurations described above. Specifically, the imaging device 1 of FIG. 1 is applicable to the image sensing unit 12031. By applying the technology according to this disclosure to the image sensing unit 12031, it is possible to detect a failure in the control signal of the image sensor arranged in the image sensing unit 12031.

Note that the aforementioned embodiments have been described to show an example of how to implement the present technology, and the matters of the embodiments correspond to the matters of claims. Conversely, the matters of the claims are supported by the embodiments of the present technology in which like names denote like elements. However, the present technology may be embodied in various forms without limiting to those of the embodiments, and various modifications may be possible without departing from the spirit and scope of the present technology.

In addition, the processing sequence described in the aforementioned embodiments may be understood on the basis of a method having such a series of processes. Furthermore, the processing sequence may also be understood as a program for executing this series of processes or a recording medium storing the same. Such a recording medium may include, for example, a compact disc (CD), a mini-disc (MD), a digital versatile disc (DVD), a memory card, a Blu-ray (registered trademark) disc, and the like.

Note that the effects described herein are merely for exemplary purposes and are not to be construed as being limitative. Other alternative effects may also be possible.

Note that the present technology may also include the following configurations.

(1) An image sensor including:
an electric charge storing element configured to store transferred electric charges;
a transfer control signal line configured to transmit a transfer control signal that controls a transfer of the electric charge generated in response to emitted light to the electric charge storing element;
a reset control signal line configured to transmit a reset control signal that controls a reset operation of the electric charge storing element;
a test signal generator configured to generate a transfer test signal on the basis of a test voltage for detecting a failure in the transfer control signal line and the reset control signal line and the transmitted transfer control signal and generate a reset test signal on the basis of the test voltage and the transmitted reset control signal;
a test voltage generator configured to supply a transfer test voltage to the test signal generator as the test voltage when the transfer test signal is generated and supply a reset test voltage to the test signal generator as the test voltage when the reset test signal is generated; and
a failure detector configured to detect a failure in the transfer control signal line and the reset control signal line on the basis of the generated transfer test signal and the generated reset test signal.

(2) The image sensor according to (1), in which the test voltage generator changes the test voltage supplied to the test signal generator when the transfer test signal is generated from the transfer test voltage to a voltage different from the transfer test voltage.

(3) The image sensor according to (1) or (2), in which the failure detector detects a failure of the transfer control signal line in a case where the transfer test signal has a voltage different from the transfer test voltage.

(4) The image sensor according to (1) or (2), in which the failure detector detects a failure of the transfer control signal line in a case where the reset test signal has a voltage different from the reset test voltage.

(5) The image sensor according to (1) or (2), in which the failure detector detects a failure of the reset control signal line in a case where the reset test signal has a voltage different from the reset test voltage.

(6) The image sensor according to any of (1) to (5), in which the test voltage generator supplies, as the transfer test voltage, a reset voltage which is a voltage applied to the electric charge storing element in the event of the reset operation.

(7) The image sensor according to any of (1) to (5), in which the test voltage generator supplies, as the reset test voltage, a voltage ranging within a dynamic range of an image signal depending on the electric charges stored in the electric charge storing element.

(8) The image sensor according to (1), in which the electric charge storing element is arranged in a pixel, and
an image signal depending on the electric charges stored in the electric charge storing element is generated from the pixel.

(9) The image sensor according to (8), in which the test signal generator has a capacitor configured to store the test voltage,
a signal generation element configured to generate an error signal depending on the test voltage stored in the capacitor,
a transfer test signal generator configured to apply the test voltage to the capacitor in response to the transfer control signal to allow the signal generation element to generate the transfer test signal, and
a reset control signal generator configured to apply the test voltage to the capacitor in response to the reset control signal to allow the signal generation element to generate the reset test signal.

(10) The image sensor according to (8) or (9), further including a pixel selection control signal line configured to transmit, to the pixel, a pixel selection control signal that controls output of the generated image signal from the pixel,
in which the test signal generator outputs the transfer test signal and the reset test signal in response to the transmitted pixel selection control signal, and
the failure detector further detects a failure of the pixel selection control signal line on the basis of the output transfer test signal and the output reset test signal.

(11) The image sensor according to (10), in which the failure detector detects a failure of the pixel selection control signal line in a case where the transfer test signal has a voltage different from the transfer test voltage.

(12) The image sensor according to (10), in which the failure detector detects a failure of the pixel selection control signal line in a case where the reset test signal has a voltage different from the reset test voltage.

(13) The image sensor according to any of (8) to (12), further including a control signal generator configured to generate the transfer control signal and the reset control signal and transmit the transfer control signal and the reset control signal through the transfer control signal line and the reset control signal line, respectively.

(14) The image sensor according to (13), in which the transfer control signal line has a signal line commonly connected to the control signal generator, the pixel, and the test signal generator in this order, and
the reset control signal line has a signal line commonly connected to the control signal generator, the pixel, and the test signal generator in this order.

(15) The image sensor according to (13), further including:
a second control signal generator configured to generate the transfer control signal and the reset control signal; and a second test signal generator configured to generate the transfer test signal and the reset test signal, in which the transfer control signal line has a signal line commonly connected to the control signal generator, the test signal generator, the pixel, the second test signal generator, and the second control signal generator in this order, and the reset control signal line has a signal line commonly connected to the control signal generator, the test signal generator, the pixel, the second test signal generator, and the second control signal generator in this order.

(16) The image sensor according to any of (9) to (15), in which the pixels are arranged in a matrix shape, the test signal generator is arranged in each row, the transfer control signal line is arranged each row to transmit the transfer control signal to the pixel and the test signal generator, the reset control signal line is arranged in each row to transmit the reset control signal to the pixel and the test signal generator, and the failure detector detects a failure in a plurality of the transfer control signal lines and a plurality of the reset control signal lines on the basis of the transfer test signal output from a plurality of the test signal generators and the reset test signal output from a plurality of the test signal generators.

(17) The image sensor according to (16), further including a failure information generator configured to generate failure information as information on the failed row in which at least one of the transfer control signal lines and the reset control signal lines is failed on the basis of a result of the detection of the failure detector.

(18) The image sensor according to (17), further including a correction unit configured to correct the output image signal on the basis of the generated failure information.

(19) The image sensor according to any of (8) to (18), in which the control signal generator is formed in a semiconductor chip different from that in which the pixel and the test signal generator are formed, the transfer control signal line transmits the transfer control signal between the different semiconductor chips through a connection terminal, and the reset control signal line transmits the reset control signal between the different semiconductor chips through a connection terminal.

(20) An imaging device including:

an electric charge storing element configured to store a transferred electric charge;

a transfer control signal line configured to transmit a transfer control signal that controls a transfer of the electric charges generated in response to emitted light to the electric charge storing element;

a reset control signal line configured to transmit, to the pixel, a reset control signal that controls a reset operation of the electric charge stored in the electric charge storing element;

a test signal generator configured to generate a transfer test signal on the basis of a test voltage for detecting a failure in the transfer control signal line and the reset control signal line and the transmitted transfer control signal and generate a reset test signal on the basis of the test voltage and the transmitted reset control signal;

a test voltage generator configured to supply a transfer test voltage to the test signal generator as the test voltage when the transfer test signal is generated and supply a reset test voltage to the test signal generator as the test voltage when the reset test signal is generated;

a failure detector configured to detect a failure in the transfer control signal line and the reset control signal line on the basis of the generated transfer test signal and the generated reset test signal; and a processing circuit configured to process an image signal generated depending on the electric charge stored in the electric charge storing element.

(21) An imaging device comprising:

a first pixel comprising:

a first transfer transistor, wherein a first terminal of the first transfer transistor is coupled to a reference signal generation circuit;

a first reset transistor, wherein a first terminal of the first reset transistor is coupled to the reference signal generation circuit;

a first amplifier transistor, wherein a gate of the first amplifier transistor is coupled to a second terminal of the first reset transistor and a second terminal of the first transfer transistor; and a first select transistor coupled to the first amplifier transistor; and a second pixel comprising:

a first photoelectric conversion element;

a second transfer transistor coupled to the first photoelectric conversion element;

a second reset transistor configured to receive a first predetermined voltage;

a second amplifier transistor coupled to the second transfer transistor and the second reset transistor; and a second select transistor coupled to the second amplifier transistor.

(22) The imaging device according to (21), wherein the first pixel further comprises an electric charge storing element coupled to the second terminal of the first transfer transistor.

(23) The imaging device according to (21) or (22), wherein the second pixel further comprises an electric charge storing element coupled to the second transfer transistor.

(24) The imaging device according to (23), wherein the second transfer transistor has a first terminal coupled to the first photoelectric conversion element, a second terminal coupled to the electric charge storing element, and a gate configured to receive a transfer enabling signal.

(25) The imaging device according to any of (21)-(24), wherein the reference signal generation circuit is configured to provide the first pixel with a first voltage and a second voltage different from the first voltage.

(26) The imaging device according to (25), wherein the first transfer transistor is configured to transfer the first voltage to the first amplifier transistor and the first reset transistor is configured to transfer the second voltage to the first amplifier transistor.

(27) The imaging device according to any of (21)-(26), further comprising a failure detector coupled to an output terminal of the first select transistor, the failure detector comprising at least one comparison element.

(28) The imaging device according to (27), wherein the failure detector is disposed on a first chip and the first pixel is disposed on a second chip, and wherein the failure detector is coupled to the output terminal of the first select transistor via an inter-chip connection terminal.

(29) The imaging device according to (27), wherein the failure detector is coupled to the output terminal of the first select transistor via an analog-to-digital conversion element.

(30) The imaging device according to (29), wherein the at least one comparison element is configured to compare a signal provided by the analog-to-digital conversion element with a signal provided by a test voltage storing element.

(31) The imaging device according to any of (21)-(30), wherein the second pixel further comprises a first diagnosis transistor coupled to the first photoelectric conversion element and the second transfer transistor.

(32) The imaging device according to any of (21)-(31), wherein the first pixel further comprises a second diagnosis transistor and a second photoelectric conversion element, wherein the second diagnosis transistor is coupled to the second photoelectric conversion element and the first transfer transistor.

(33) The imaging device according to (32), wherein the first terminal of the first transfer transistor is coupled to the reference signal generation circuit via the second diagnosis transistor.

(34) The imaging device according to any of (21)-(33), wherein, when the first reset transistor is enabled, an electric charge storing element is reset.

(35) The imaging device according to any of (21)-(34), wherein the second transfer transistor has a first terminal coupled to the first photoelectric conversion element.

(36) The imaging device according to (35), wherein the second transfer transistor has a second terminal coupled to a gate of the second amplifier transistor and a gate configured to receive a transfer enabling signal.

(37) The imaging device according to (36), wherein the gate of the second amplifier transistor is configured to receive a signal from the second transfer transistor based on an electric charge generated by the photoelectric conversion element.

(38) The imaging device according to any of (21)-(37), wherein the first pixel and the second pixel are part of a same pixel row, and wherein a gate of the first transfer transistor is coupled to a gate of the second transfer transistor.

(39) The imaging device according to any of (21)-(38), wherein at least one among the first transfer transistor, the first select transistor, the first reset transistor and the first amplifier transistor is an NMOS transistor.

REFERENCE SIGNS LIST

1 Imaging device
10 Pixel array unit
11 Signal line
20 Driving unit
21 Signal line
110 Pixel
111 Photoelectric conversion element
112 Electric charge storing element
113 Electric charge transfer element
114 Reset element
115 Signal generation element
116 Signal output element
117 Diagnosis unit
120, 130 Test signal generator
140 Resistor
160 Connection terminal
210, 220 Vertical scanning unit
211 Address decoder
212 Pixel driving unit
230 A/D conversion unit
231 A/D conversion element
232 Constant current power source
233 Selector
240 Test voltage generator
250 Reference signal generator
260 Control unit
270 Signal processing unit
280 Failure detector
281 Test voltage storing element
284 Failure information generator
285 Signal shaping element
286 Encoder
287, 289 Failure information generator
288 Test signal converter
290 Correction unit
410 Pixel unit
420 Failure detection unit
12031 Image sensing unit

The invention claimed is:

1. An imaging device comprising:
 a first pixel comprising:
  a first transfer transistor, wherein a first terminal of the first transfer transistor is coupled to a test voltage generator and a second terminal of the first transfer transistor is coupled to a transfer control signal line from a vertical scanning unit;
  a first reset transistor, wherein a first terminal of the first reset transistor is coupled to the test voltage generator and a second terminal of the first reset transistor is coupled to a reset control signal line from the vertical scanning unit, wherein the first terminal of the first transfer transistor and the first terminal of the first reset transistor are configured to receive from the test voltage generator a transfer test voltage during a transfer signal test and a reset test voltage, different from the transfer test voltage, during a reset signal test;
  a first amplifier transistor, wherein a gate of the first amplifier transistor is directly coupled to a third terminal of the first reset transistor and is directly coupled to a third terminal of the first transfer transistor; and
  a first select transistor coupled to the first amplifier transistor; and
 a second pixel comprising:
  a first photoelectric conversion element;
  a second transfer transistor having a first terminal coupled to the first photoelectric conversion element;
  a second reset transistor configured to receive a first predetermined voltage;
  a second amplifier transistor coupled to the second transfer transistor and the second reset transistor; and
  a second select transistor coupled to the second amplifier transistor.

2. The imaging device according to claim 1, wherein the first pixel further comprises an electric charge storing element coupled to the third terminal of the first transfer transistor.

3. The imaging device according to claim 1, wherein the second pixel further comprises an electric charge storing element coupled to the second transfer transistor.

4. The imaging device according to claim 3, wherein the second transfer transistor has a second terminal coupled to the electric charge storing element, and a gate configured to receive a transfer enabling signal on the transfer control signal line.

5. The imaging device according to claim 1, wherein the test voltage generator is configured to provide the first pixel with a first voltage and a second voltage different from the first voltage.

6. The imaging device according to claim 5, wherein the first transfer transistor is configured to transfer the first voltage to the first amplifier transistor and the first reset transistor is configured to transfer the second voltage to the first amplifier transistor.

7. The imaging device according to claim 1, further comprising a failure detector coupled to an output terminal of the first select transistor, the failure detector comprising at least one comparison element.

8. The imaging device according to claim 7, wherein the failure detector is disposed on a first chip and the first pixel is disposed on a second chip, and wherein the failure detector is coupled to the output terminal of the first select transistor via an inter-chip connection terminal.

9. The imaging device according to claim 7, wherein the failure detector is coupled to the output terminal of the first select transistor via an analog-to-digital conversion element.

10. The imaging device according to claim 9, wherein the at least one comparison element is configured to compare a signal provided by the analog-to-digital conversion element with a signal provided by a test voltage storing element.

11. The imaging device according to claim 1, wherein, when the first reset transistor is enabled, an electric charge storing element is reset.

12. The imaging device according to claim 1, wherein the second transfer transistor has a second terminal coupled to a gate of the second amplifier transistor and a gate configured to receive a transfer enabling signal on the transfer control signal line.

13. The imaging device according to claim 12, wherein the gate of the second amplifier transistor is configured to receive a signal from the second transfer transistor based on an electric charge generated by the photoelectric conversion element.

14. The imaging device according to claim 1, wherein the first pixel and the second pixel are part of a same pixel row, and wherein a gate of the first transfer transistor is coupled to a gate of the second transfer transistor.

15. The imaging device according to claim 1, wherein at least one among the first transfer transistor, the first select transistor, the first reset transistor and the first amplifier transistor is an NMOS transistor.

* * * * *